(12) United States Patent
Chou

(10) Patent No.: US 11,976,516 B2
(45) Date of Patent: May 7, 2024

(54) WINDOW BLIND MOUNTING SYSTEM

(71) Applicants: Tser Wen Chou, Yorba Linda, CA (US); Mason Chou, Irvine, CA (US)

(72) Inventor: Tser Wen Chou, Yorba Linda, CA (US)

( * ) Notice: Subject to any disclaimer, the term of this patent is extended or adjusted under 35 U.S.C. 154(b) by 168 days.

(21) Appl. No.: 17/687,189

(22) Filed: Mar. 4, 2022

(65) Prior Publication Data

US 2023/0119716 A1 Apr. 20, 2023

Related U.S. Application Data

(63) Continuation-in-part of application No. 17/576,133, filed on Jan. 14, 2022.

(30) Foreign Application Priority Data

Oct. 15, 2021 (TW) .................................. 110212167
Nov. 16, 2021 (TW) .................................. 110213505
Feb. 23, 2022 (TW) .................................. 111201897

(51) Int. Cl.
*F16B 5/06* (2006.01)
*E06B 9/323* (2006.01)

(52) U.S. Cl.
CPC ................ *E06B 9/323* (2013.01); *F16B 5/06* (2013.01)

(58) Field of Classification Search
CPC ... E06B 9/323; E06B 9/50; E06B 9/38; F16B 5/06
See application file for complete search history.

(56) References Cited

U.S. PATENT DOCUMENTS 6,382,296 B1 * 5/2002 Judkins ................... E06B 9/323
160/902
8,201,789 B1 * 6/2012 Chou ...................... E06B 9/323
248/221.11

FOREIGN PATENT DOCUMENTS

WO WO-2022076282 A1 * 4/2022 ............. E06B 9/266

* cited by examiner

*Primary Examiner* — Lee A Holly
(74) *Attorney, Agent, or Firm* — J.H. Lin Patent Law P.C.; John H. Lin

(57) ABSTRACT

A mounting system for window blinds is provided. The mounting system provides components that can be used to mount a window blind or shade. The components of the mounting system include flex brackets, mounting clips, railing devices, adjustable arms, spacers, etc. These components can be provided in different combinations to mount different types of blinds or shades to walls or ceilings, regardless of whether the wall to be mounted to is above, behind, or to the sides of the window blind.

20 Claims, 30 Drawing Sheets

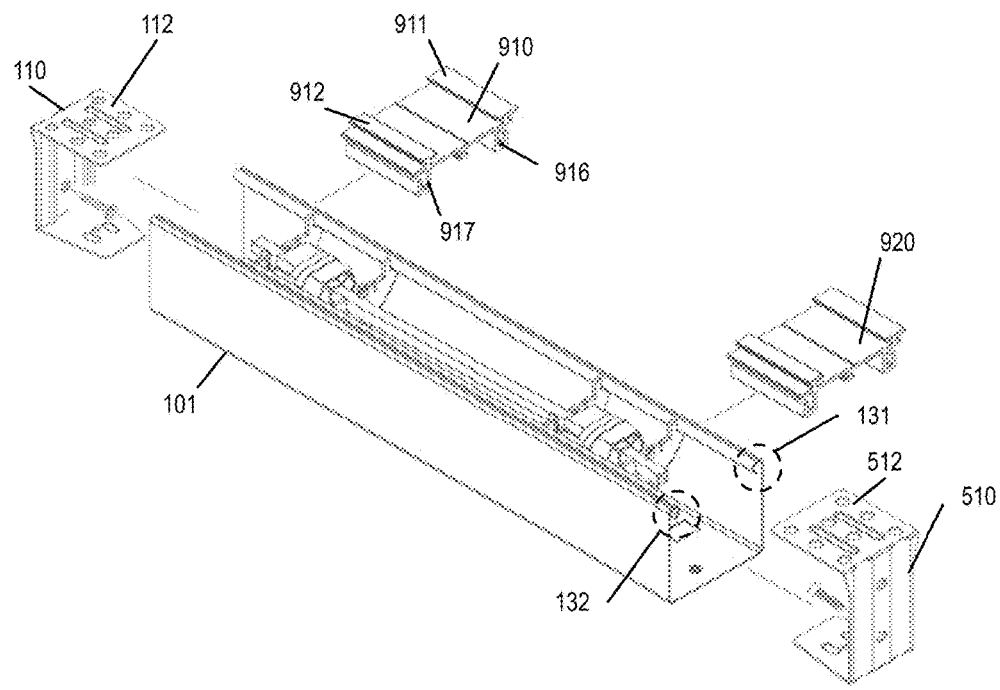
*FIG. 10A*
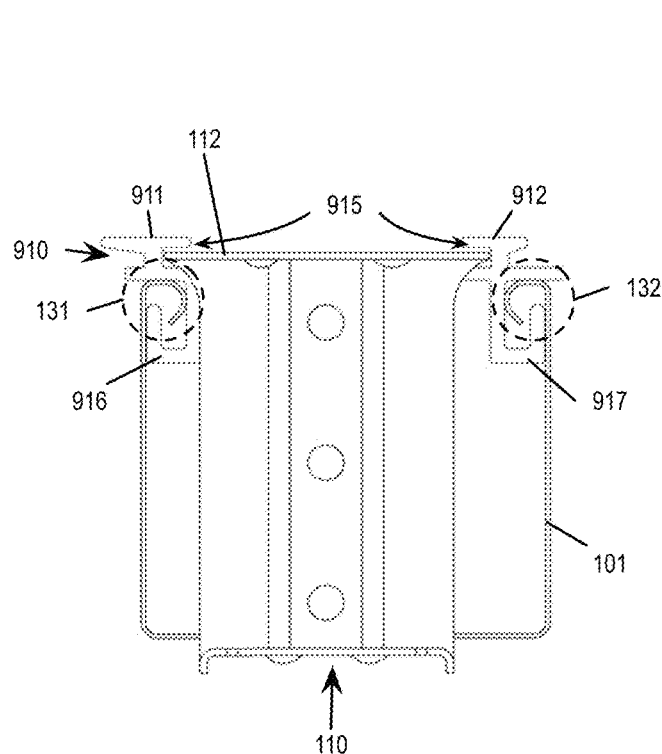
*FIG. 10C*
*FIG. 10B*

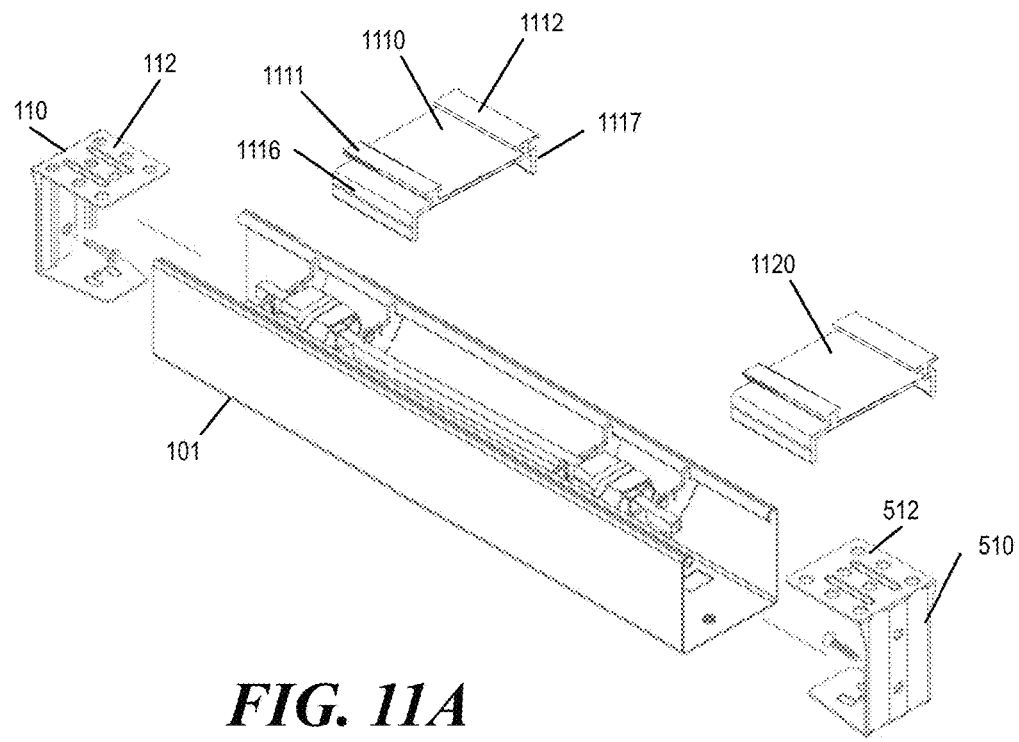
FIG. 11A
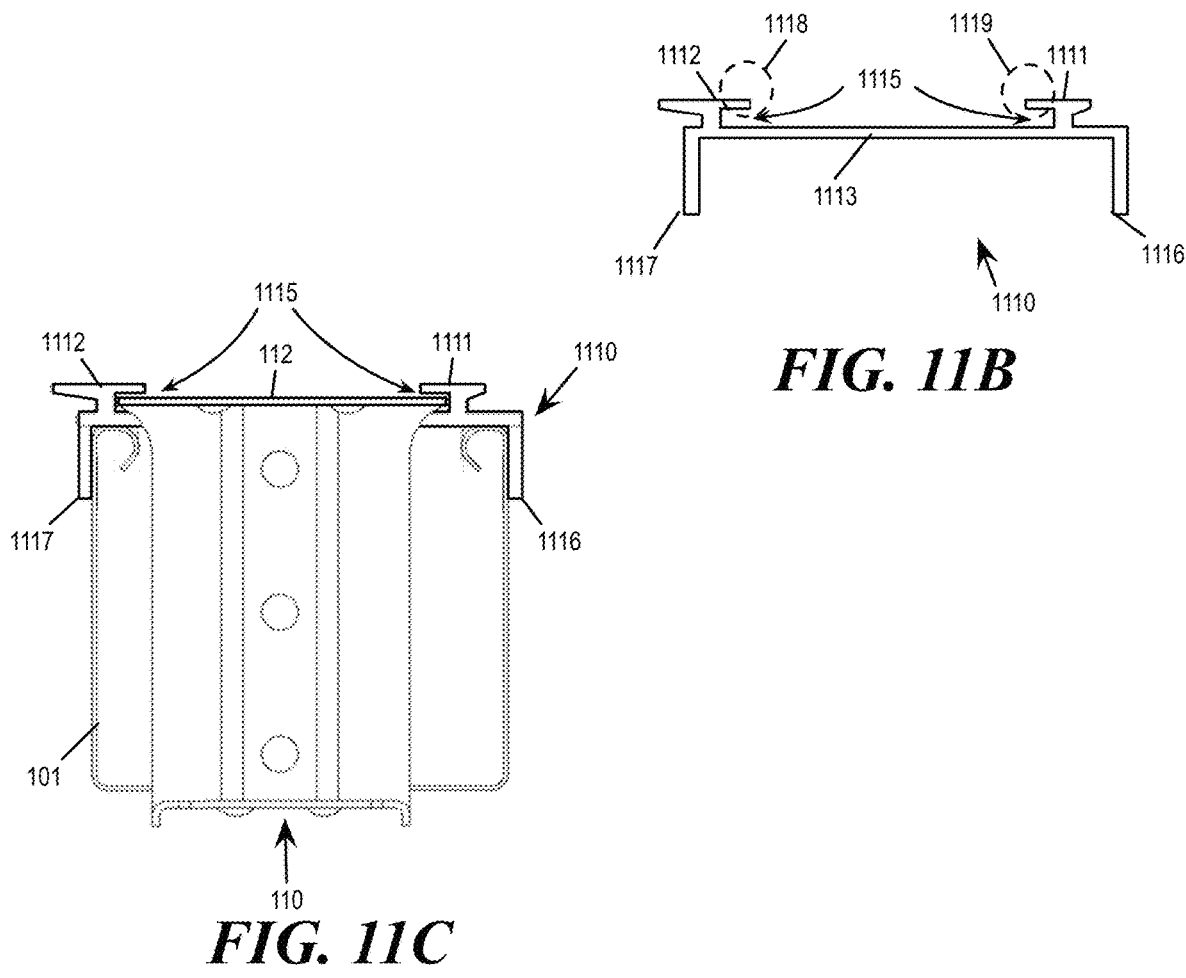
FIG. 11B
FIG. 11C

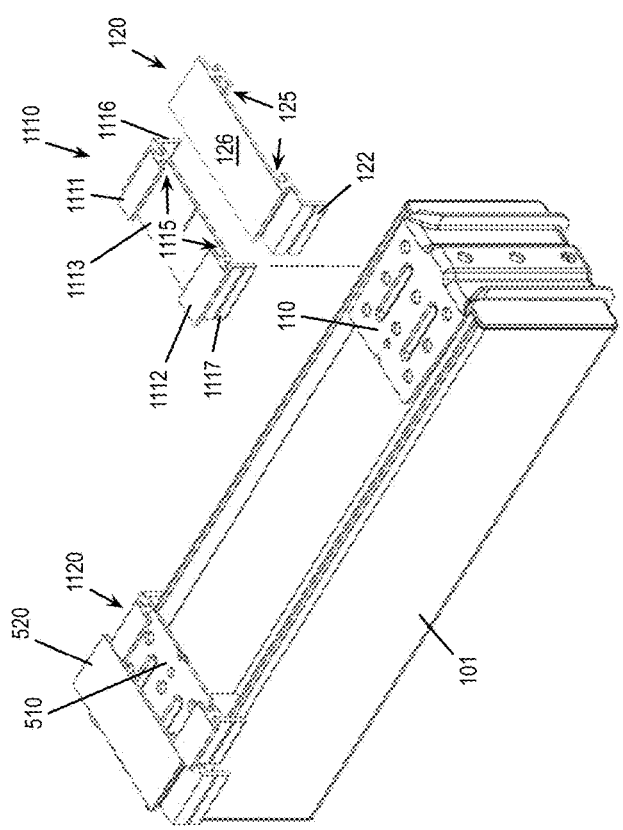
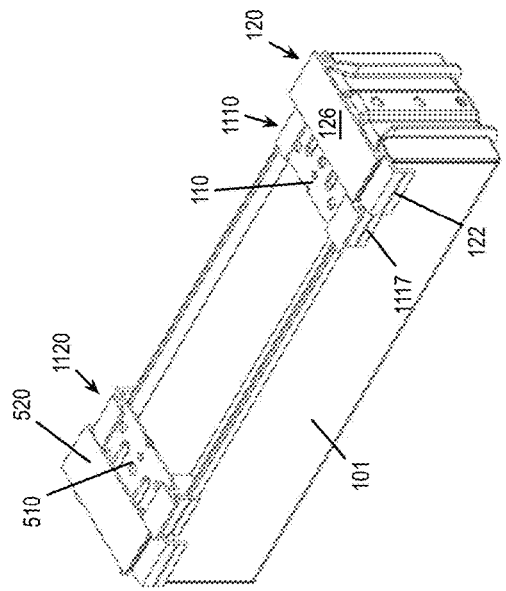
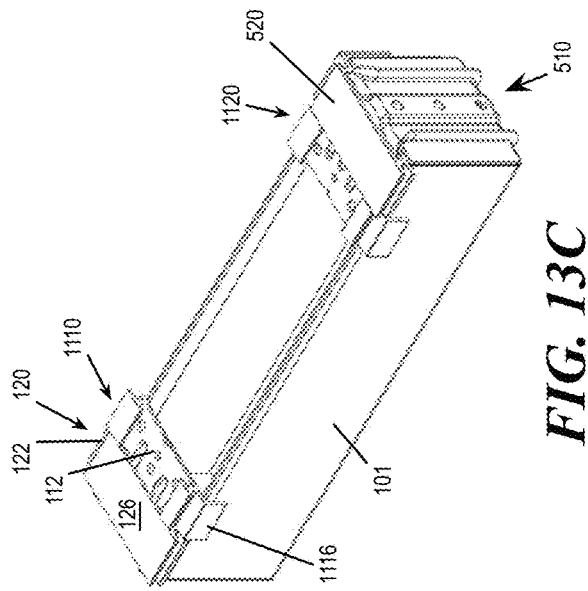
FIG. 13A
FIG. 13B
FIG. 13C

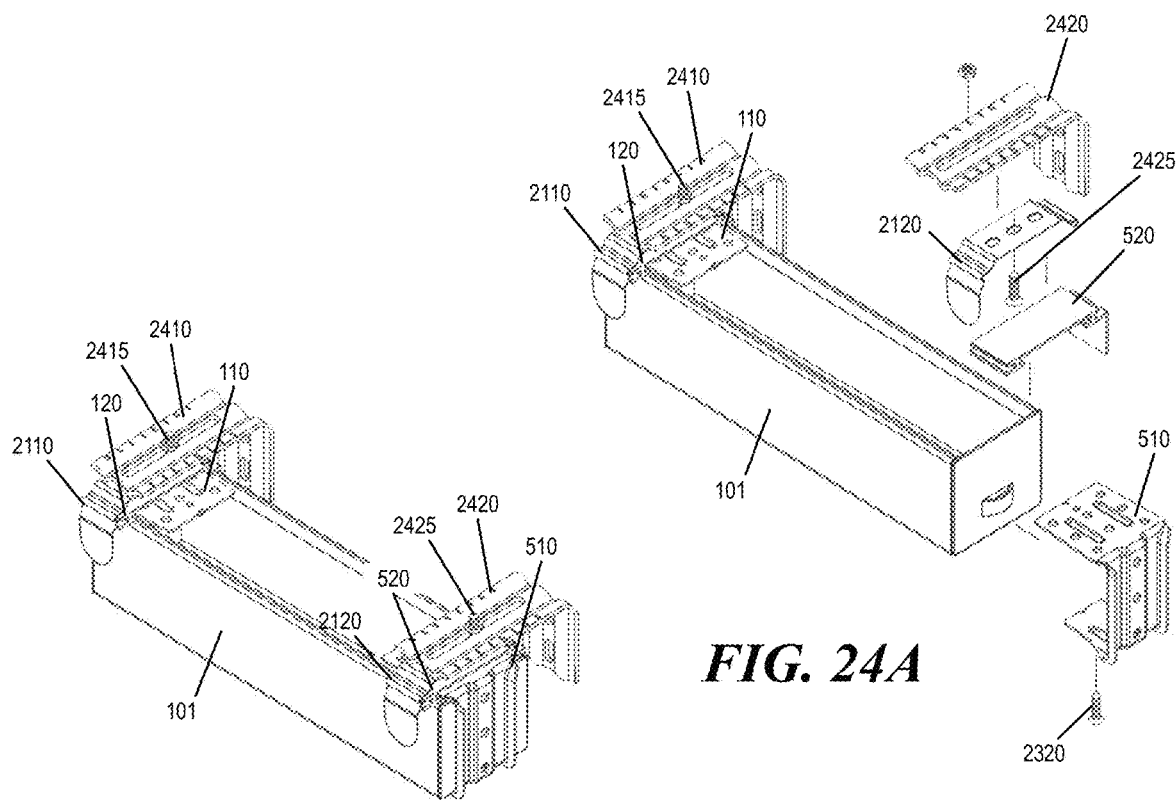
FIG. 24A
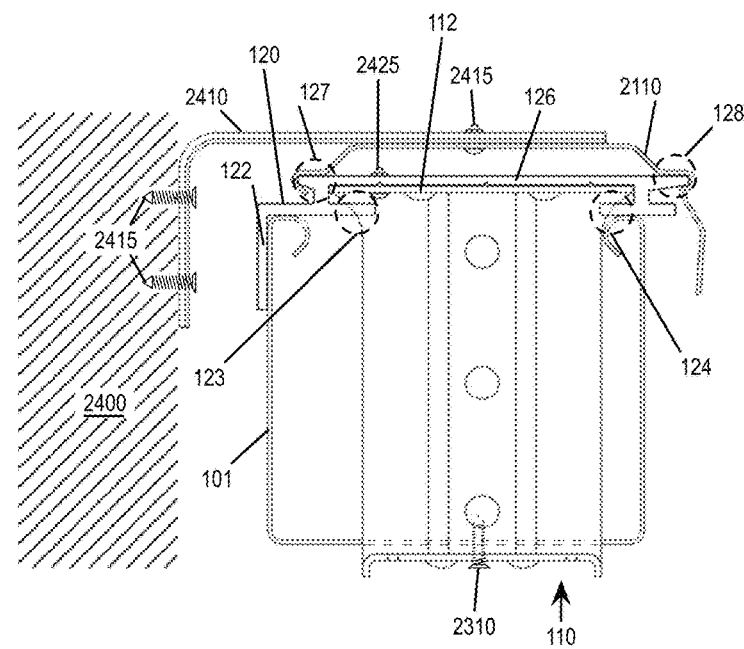
FIG. 24B
FIG. 24C

WINDOW BLIND MOUNTING SYSTEM

CROSS REFERENCE TO RELATED APPLICATIONS

This patent application is a continuation-in-part application of U.S. patent application Ser. No. 17/576,133, filed on Jan. 14, 2022. The U.S. patent application Ser. No. 17/576,133 claims the benefit and priority of Taiwanese Patent Applications No. 110212167, filed on Oct. 15, 2021, and No. 110213505, filed on Nov. 16, 2021. This patent application also claims the benefit and priority of Taiwanese Patent Application No. 111201897, filed on Feb. 23, 2022. Taiwanese patent applications No. 110212167, No. 110213505, and No. 111201897, and U.S. patent application Ser. No. 17/576,133 are incorporated herein by reference.

BACKGROUND

Technical Field

The present disclosure generally relates to mechanisms and components for mounting window blinds or shades.

Description of the Related Arts

The installation of a window blind or shade system often involves using two or more box brackets to support the weight of the installed window blind or shade. The box brackets are mounted to a wall or ceiling surface near the window, and a headpiece of the blind or shading system is placed into the box bracket, which then closes to hold the blind system in place. A box bracket has two large metallic pieces, which sometimes cause box brackets to become scarce and pricey commodities.

SUMMARY

Some embodiments of the invention provide a mounting system for window blinds. The mounting system provides components that can be used to mount a window blind or shade. The components of the mounting system include flex brackets, mounting clips, railing devices, adjustable arms, spacers, etc. These components can be provided in different combinations to mount different types of blinds or shades to walls or ceilings, regardless of whether the wall to be mounted to is above, behind, or to the sides of the window blind.

In some embodiments, the system provides a flex bracket comprising a top plate, a middle plate, and a bottom plate that are configured to form an embrace for supporting a headpiece casing of the window blind. The system provides a first railing device that includes (i) a first recess cavity for mating with the top plate of the flex bracket to fix the first railing device to the flex bracket and (ii) a sidewall configured to abut the headpiece casing. The system provides a second railing device that includes (i) a second recess cavity for mating with the top plate of the flex bracket to fix the second railing device to the flex bracket and (ii) two guide rails configured to abut two exterior surfaces of the headpiece casing. The guide rails serve as sliding guide when the second railing device slide along the headpiece to mate with the flex bracket without falling off and secures the headpiece to the embrace of the flex bracket after mating.

In some embodiments, the flex bracket is configured to be mounted to a wall surface that is inside a window frame, and the flex bracket is configured to be mounted by fasteners through the middle plate of the flex bracket to a wall surface that is inside a window frame.

In some embodiments, the first recess cavity is formed by (i) a first flat plate that is configured to span across the flex bracket and (ii) two inward protrusions below the flat plate. In some embodiments, the center of the first recess cavity is not aligned with the center of the headpiece casing. In some embodiments, the sidewall of the first railing device is L-shaped and is configured to abut a side surface and a bottom surface of the headpiece casing and is configured to be fastened to a wall surface. In some embodiments, the system provides a mounting spacer, and the sidewall is configured to be fastened to the wall surface through the mounting spacer.

In some embodiments, the second recess cavity is formed by (i) a second flat plate that is configured to span across the headpiece and connecting the two guide rails of the second railing device, and (ii) two inward protrusions above the second flat plate.

In some embodiments, the flex bracket is configured to be mounted by fasteners to a wall surface above, the fasteners go through the top plate of the flex bracket, the first railing device, and a spacer. The wall surface may be inside a window frame. The spacer is configured to provide sufficient room for the first railing device to slide along the headpiece casing.

In some embodiments, the system provides a flex bracket includes a top plate, a middle plate, and a bottom plate. The bottom plate is configured to be fastened to the headpiece casing of the window blind. The system provides a first railing device comprising (i) a first recess cavity for mating with the top plate of the flex bracket to fix the first railing device to the flex bracket and (ii) two outward protrusions that are configured to be snapped onto by the mounting clip. The system provides a mounting clip that is configured to snap onto the first railing device. The system provides a mounting bracket that is configured to be mounted to a vertical wall surface and to be fastened to by the mounting clip. The vertical wall may be outside of a window frame. The mounting bracket is L-shaped and includes a first section for fastening to the vertical wall surface and a second section to be fastened to by the mounting clip.

In some embodiments, the first railing device includes two inward protrusions and a first flat plate that is configured to span the width of the headpiece casing. The first recess cavity is formed by the first flat plate and the two inward protrusions. The first railing device has a sidewall that is configured to abut the headpiece casing. In some embodiments, the two outward protrusions are two ends of the flat plate.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIGS. 10A-C illustrate using a railing segment with bottom rails and top rails to constrain or secure a headpiece to a flex bracket.

FIGS. 11A-B illustrate a railing segment that constrains the headpiece to the flex bracket by having bottom rails that abut the exterior surface of a headpiece casing.

FIGS. 13A-C show backstop railing segments and locking railing segments that are mated with flex brackets for mounting a window blind.

FIGS. 24A-C illustrate mounting a window blind to a vertical wall surface using mounting clips and L-shaped mounting brackets.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Some embodiments of the invention provide a mounting system for window blinds. The mounting system includes components that can be used to mount a window blind or shade. The components of the mounting system include flex brackets, mounting clips, railing devices, adjustable arms, spacers, etc. These components can be provided in different combinations to mount different types of blinds or shades to walls, regardless of whether the wall is above, behind, or to the sides of the window blind, for both inside mount (inside a window frame) and outside mount (outside a window frame).

Figure 1:
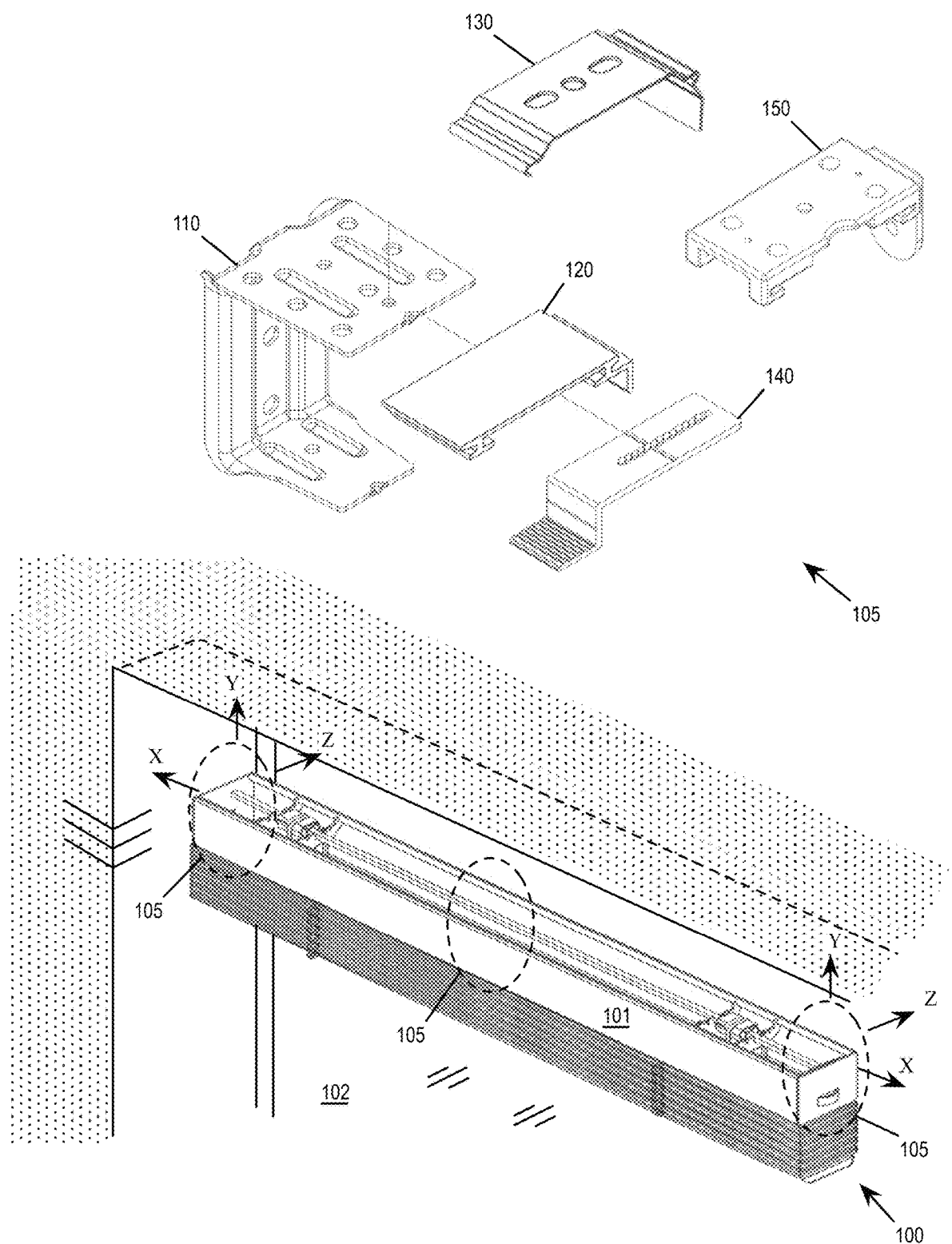
FIG. 1 illustrates the components of a window blind mounting system, consistent with an exemplary embodiment.

FIG. 1 illustrates the components of a window blind mounting system 105, consistent with an exemplary embodiment. The figure conceptually illustrates a window blind 100 being installed for a window 102 by using the window blind mounting system 105. The window blind 100 comprises a headpiece 101, which may include a roller or a casing for cords or other control mechanisms of the window blind 100.

The window blind mounting system 105 may be implemented by components such as a flex bracket 110, a railing segment 120, a mounting clip 130, an adjustable arm 140, a spacer 150, among others that are not illustrated. A combination of one or more of these components may be used to mount the window blind 105 to the wall behind the blind (Z-direction), or to the wall to the left and right of the blind (X-direction), or to the wall or ceiling above the blind (Y-direction).

Figure 2A:
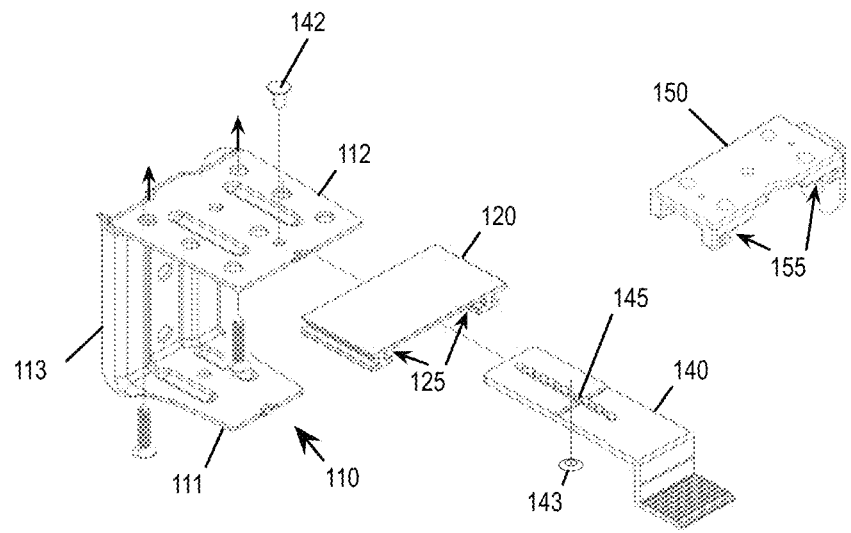
FIGS. 2A-B illustrate mounting a flex bracket.
Figure 2B:
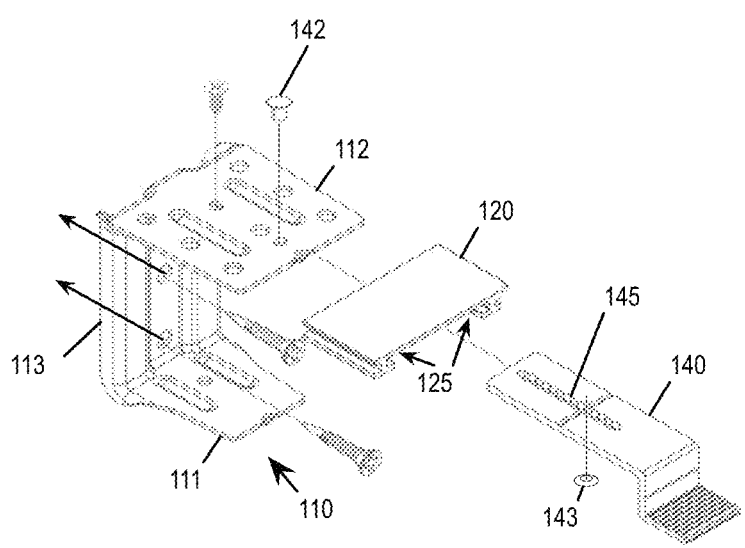

FIGS. 2A-B illustrate the mounting of a flex bracket. The flex bracket can be used in a variety of different ways for mounting a window blind. As illustrated, the flex bracket 110 has a C-shaped or a tipped-over U-shaped structure that includes three sections: a bottom plate 111, a top plate 112, and a middle plate 113. The three plates form an embrace to support a headpiece of a window blind. (A flex bracket is therefore also referred to as support bracket.) The bottom plate 111 is configured to support the weight of the window blind. The top plate 112 is configured to mate with a recess cavity 125 in the railing segment 120 (or a recess cavity 155 in the spacer 150) for securing the headpiece 101 of the window blind 100 to the flex bracket 110. The adjustable arm 140 is attached to the top plate 112 by a rivet 142 and a washer 143 through a slipping groove 145 so the adjustable arm 140 can swivel to different orientation and can extend or retract.

A railing segment such as the railing segment 120 is a segment of a railing device. A railing device is typically made of material that can support the weight of a window blind system, such as aluminum or another type of metal. A railing device may have one or more rail or beam formations that runs along its top surface and bottom surface. A railing device may be a headrail that support the entire window blind. Such a headrail may have a length that is at least half of that of the headpiece. A railing device may also be a segment thereof (hence referred to as a railing segment) whose length is a fraction of the length of the headpiece of the window blind. Two or more railing segments may be required to support the window blind. Examples of different railing devices will be described by reference to FIGS. 10, 11, and 25 below.

Fasteners can be applied to the top plate 112 to mount the flex bracket to a wall or ceiling above the window blind, or to the middle plate 113 to mount the flex bracket to a wall at a side or rear of the window blind. FIG. 2A shows the top plate 112 being used to mount the flex bracket to a wall surface above. FIG. 2B shows the middle plate 113 being used to mount the flex bracket 110 to a wall surface at the left (or the right or the rear.)

Figure 3B:
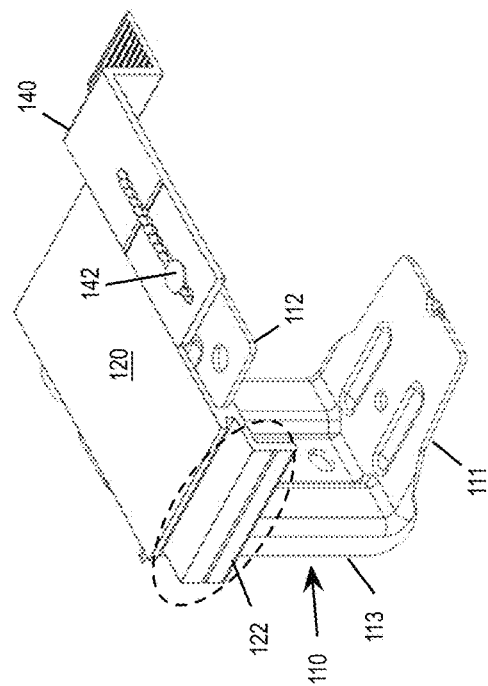
FIGS. 3A-D show an adjustable arm and a railing segment that are used to secure a headpiece of a window blind to a flex bracket.
Figure 3D:
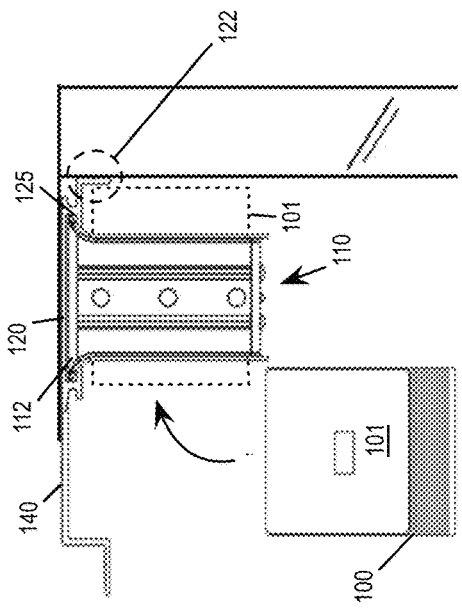
Figure 3A:
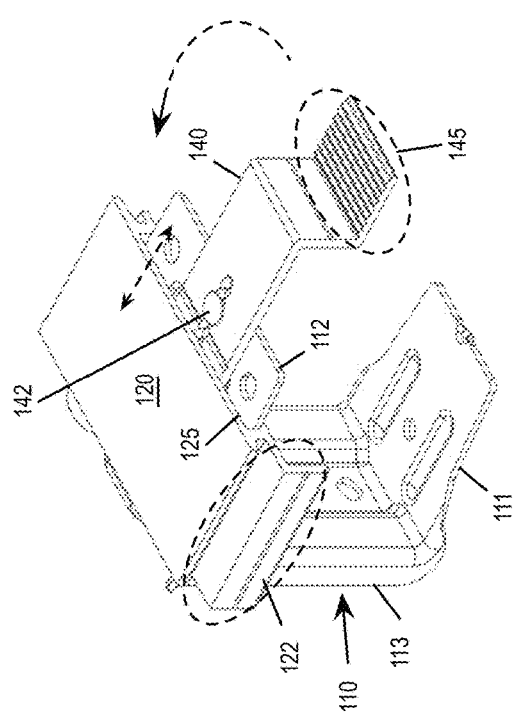

FIGS. 3A-D show an adjustable arm and a railing segment that are used to constrain or secure a headpiece of a window blind to a flex bracket. The position of the adjustable arm 140 is adjustable to accommodate the width of the headpiece 101. The adjustable arm 140 can also swivel to accommodate different mounting orientations of the flex bracket 110. FIG. 3A shows the adjustable arm in a position that is perpendicular to the middle plate 113. FIG. 3B shows the adjustable arm in a position that is parallel to the middle plate 113. The adjustable arm 140 has a handling tap 145 that protrudes out but can be cut off or shorn off after the installation is complete.

Figure 3C:
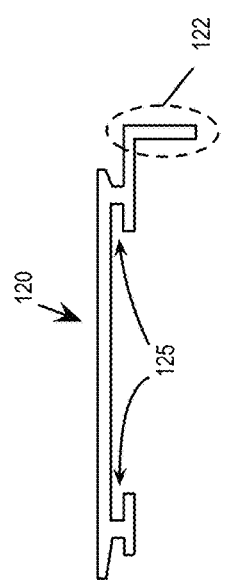

FIG. 3C illustrates a side elevation view of the railing segment 120. As illustrated, the railing segment 120 has a cavity 125 and an optional L-shaped arm 122. The optional arm 122 can be used, jointly with the adjustable arm 140, to constrain or guide the headpiece 101 to a desired position. The optional arm 122 of the railing segment 120 may also be used to guarantee spacing between the mount assembly (based on the flex bracket 110) and the wall. FIG. 3D illustrates a side elevation view of the flex bracket when the optional arm of the railing segment 120 is used to provide spacing with the wall and for securing the headpiece 101 of the window blind 100. The figure also illustrates the cavity 125 of the railing segment 120 being used to recess or mate with the top plate 112.

Figure 4A:
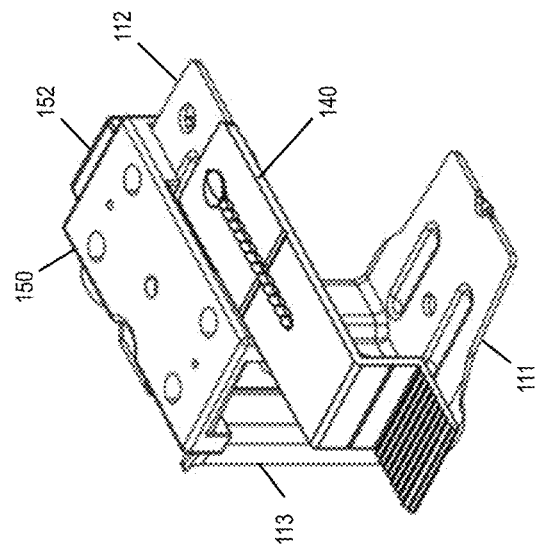
FIGS. 4A-D show an adjustable arm and a spacer that are used to secure a headpiece of a window blind to the flex bracket.
Figure 4B:
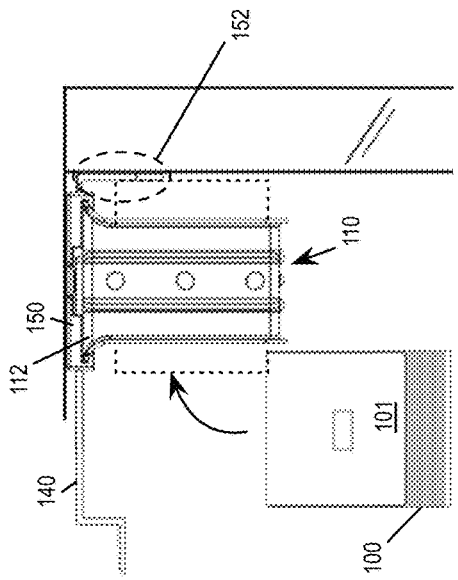

The railing segment 120 is a headrail segment that functions as a spacer. A spacer such as the railing segment 120 or the spacer 150 can move along the top plate 112 to lockdown or release the angular position of the adjustable arm 140. FIGS. 4A-D show an adjustable arm and a spacer that are used to constrain a headpiece of a window blind to the flex bracket. FIG. 4A shows the adjustable arm 140 in a perpendicular position (that is perpendicular to the middle plate 113). FIG. 4B shows the adjustable arm in a parallel position (that is parallel to the middle plate 113).

Figure 4C:
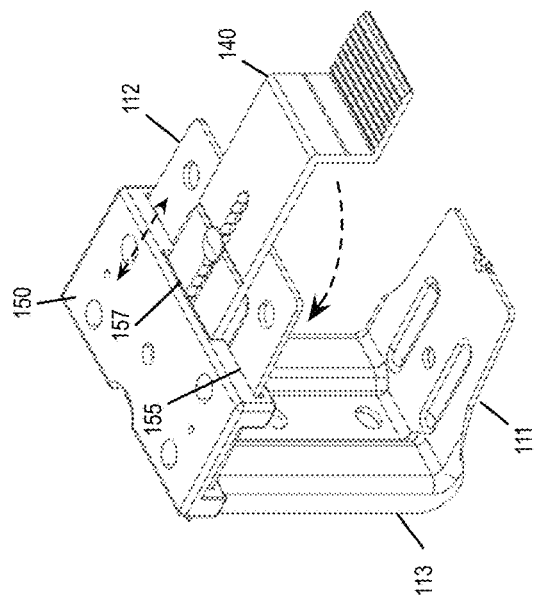
Figure 4D:
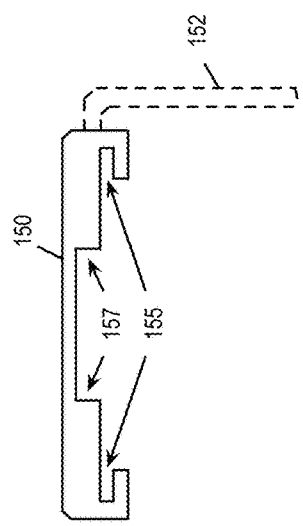

The spacer 250 has a cavity 155 for recessing the top plate 112. The spacer 150 also has an additional cavity 157 for recessing the adjustable arm 140 when the adjustable arm 140 is in the perpendicular position (as shown in e.g., FIG. 4A). FIG. 4C illustrates a side elevation view of the spacer 150 with the cavity 155 and the cavity 157. The spacer 150 has an optional arm 152 that can be used, jointly with the adjustable arm 140, to constrain or guide the headpiece 101 to a desired position. The optional arm 152 of the spacer 150 may also be used to guarantee spacing between the mount assembly (based on the flex bracket 110) and the wall. FIG. 4D illustrates a side elevation view of the flex bracket when the optional arm of the spacer is used to provide spacing with the wall. The figure also illustrates the cavity 155 of the railing segment 120 being used to recess or mate with the top plate 112.

In some embodiments, the spacer 150 and the adjustable arm 140 are manufactured from lighter or more flexible material than the flex bracket 110. For example, the flex bracket 110 may be metallic (e.g., aluminum) while the spacer 150 and the adjustable arm 140 may be plastic. This is because the flex bracket 110 is configured to support the weight of the window blind while the spacer 150 and the adjustable arm are configured to constrain the headpiece to the flex bracket 110 but not configured to support the weight of the window blind 110.

As mentioned, the adjustable arm 140 can rotate or swivel to accommodate different mounting positions. For example, the adjustable arm may swivel to the perpendicular position when the flex bracket is mounted to a wall surface behind the headpiece casing, and may swivel to the parallel position when the flex bracket is mounted to a wall surface to a side of the headpiece casing.

The adjustable arm 140 can extend to receive the headpiece 101 into the embrace of the flex bracket 110. After the blind headpiece is in place, the adjustable arm can retract to hold the headpiece in place and to conform to the width of the headpiece. In other words, the adjustable arm 140 can adapt to the dimension of the headpiece and to the installation environment of the blind.

Figure 5A:
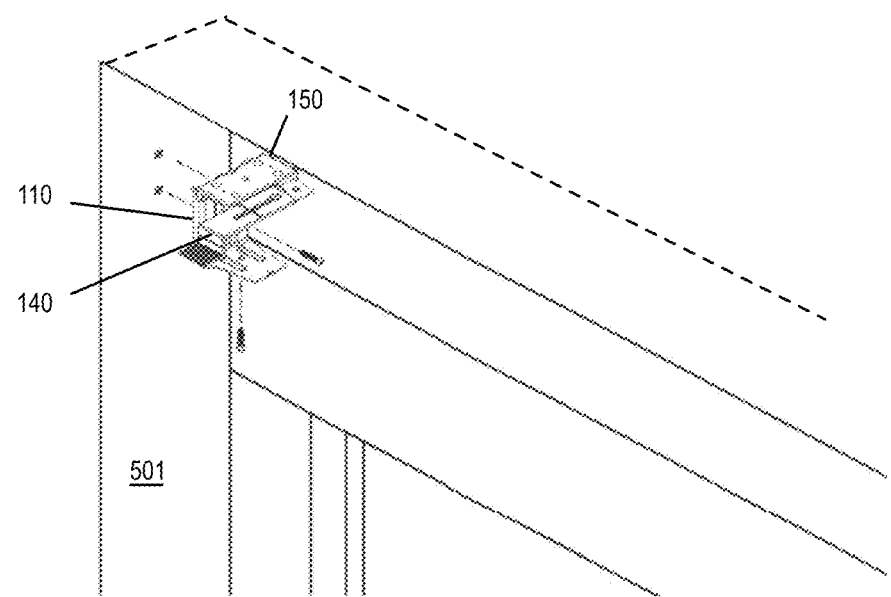
FIGS. 5A-D illustrate mounting the window blind to walls at the sides of the window blind.
Figure 5B:
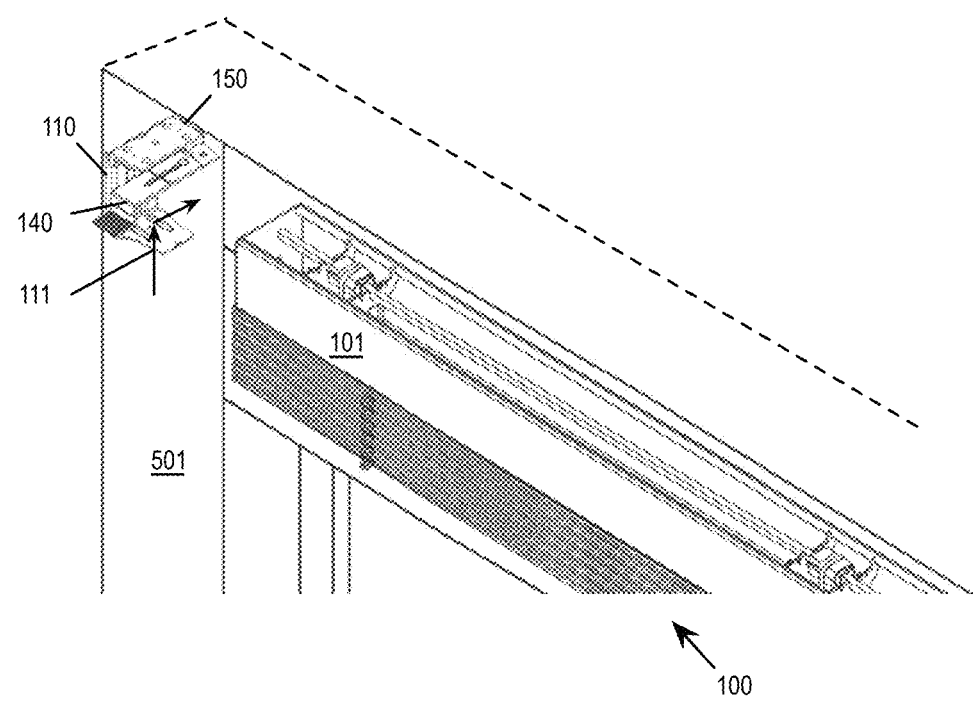
Figure 5C:
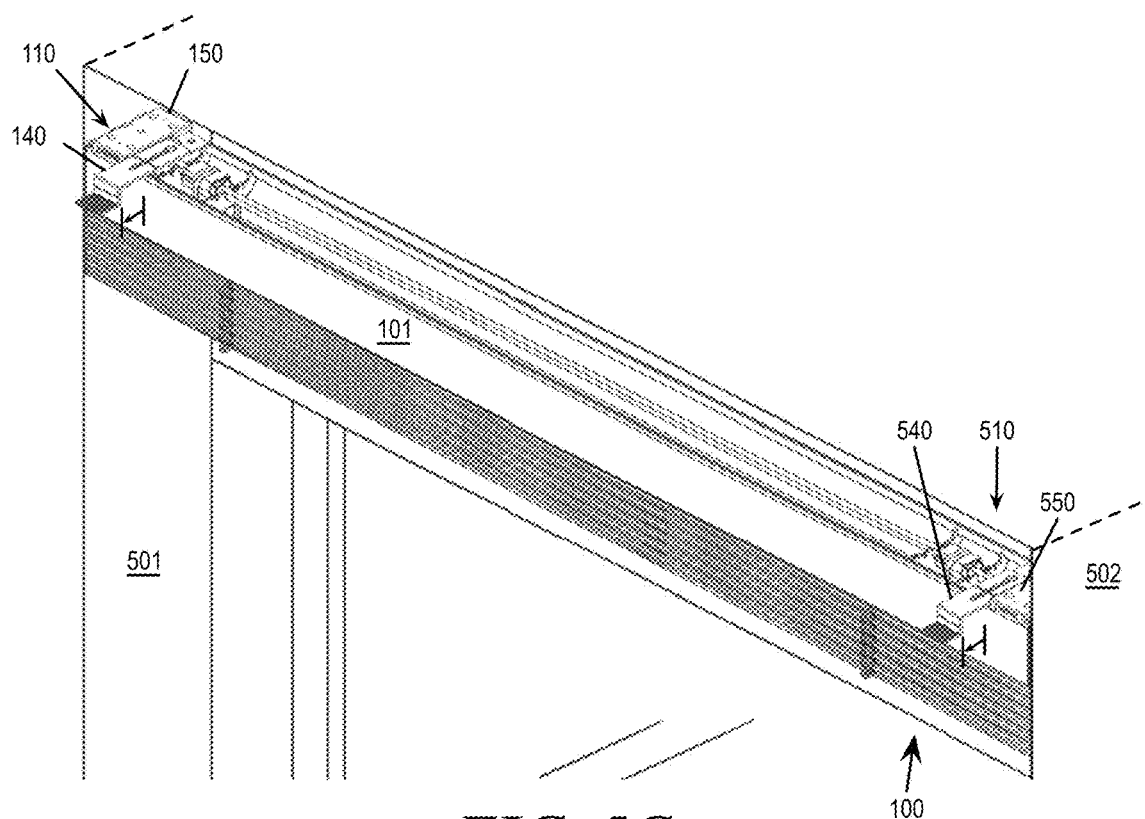
Figure 5D:
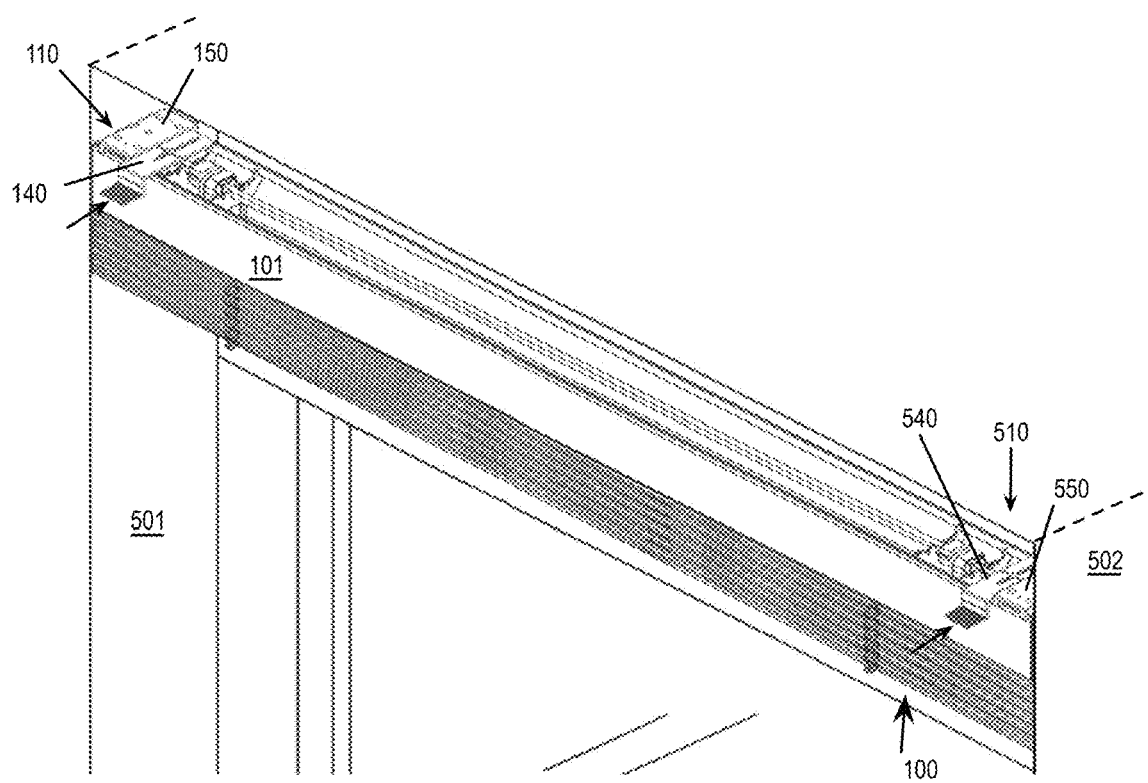

FIGS. 5A-D illustrate mounting the window blind to walls at the sides of the window blind during inside mounting (the window blind is mounted inside a window frame.) FIG. 5A shows mounting the flex bracket 110 to the wall 501 at the left of window blind to be installed (X-direction). The adjustable arm 140 swivels to the parallel position and is assembled with the spacer 150. FIG. 5B shows the window blind 100 being raised toward the flex bracket 110, and the adjustable arm 140 in an extended position to receive the headpiece 101 into the embrace of the flex bracket 110. FIG. 5C shows the headpiece 101 in the embrace of the flex bracket 110, with the adjustable arm 140 in its extended position. FIG. 5D shows the adjustable arm 140 retracted to constrain the headpiece 101 to the flex bracket 110.

Another flex bracket 510 is supporting the right end of the headpiece 101. The flex bracket 510 is assembled with an adjustable arm 540 and a spacer 550. The flex bracket 510, the adjustable arm 540, and the spacer 550 are identical to and interchangeable with the flex bracket 110, the adjustable arm 140, and the spacer 150, respectively, and serve analogous functions at the right end. Here, the flex bracket 510 is mounted to a wall 502 to the right of the window blind to be installed (X-direction), and the adjustable arm 540 swivels to the parallel position (parallel to the spacer 550).

Figure 6A:
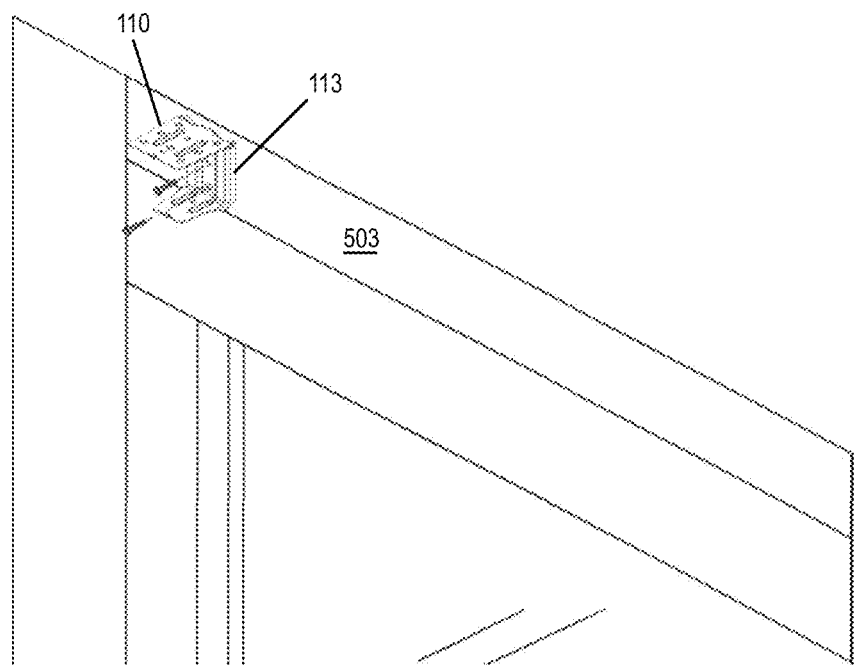
FIGS. 6A-D illustrate mounting the window blind to a wall behind the window blind.
Figure 6B:
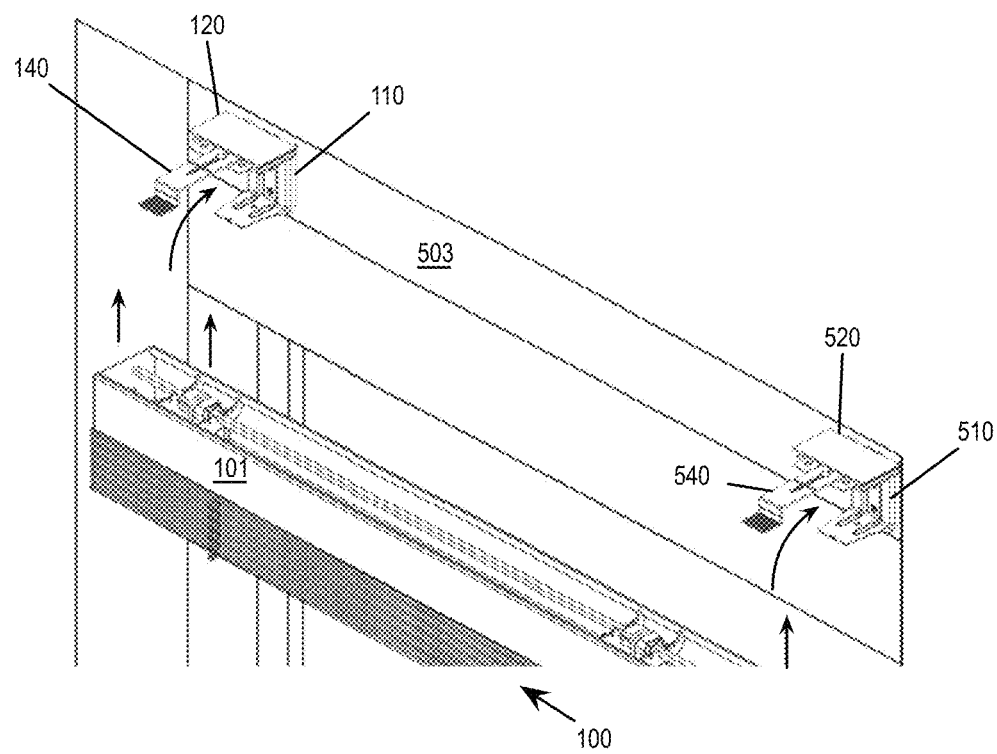
Figure 6C:
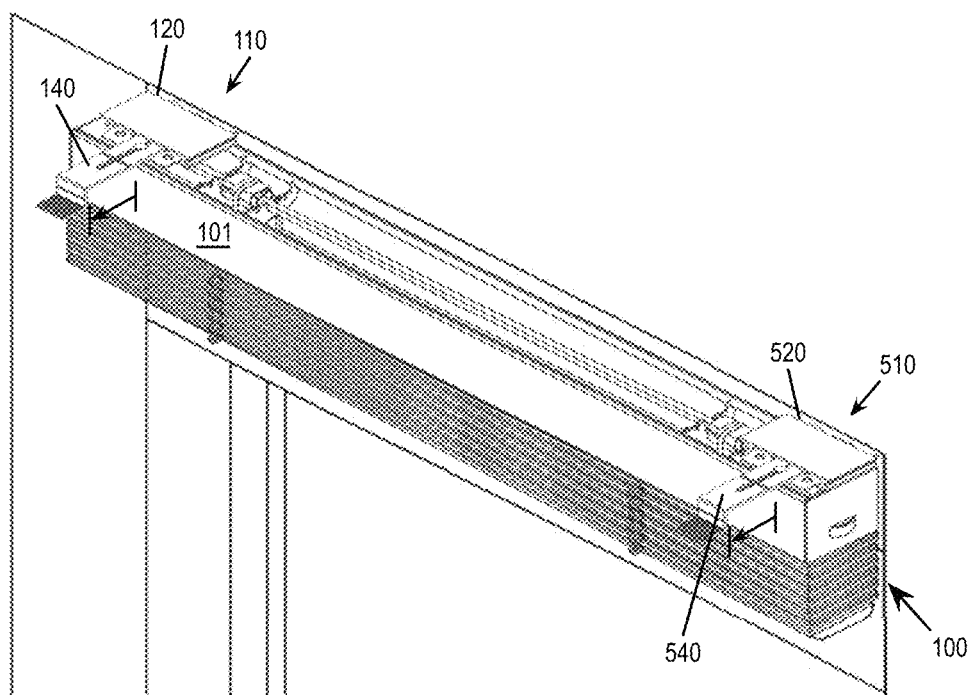
Figure 6D:
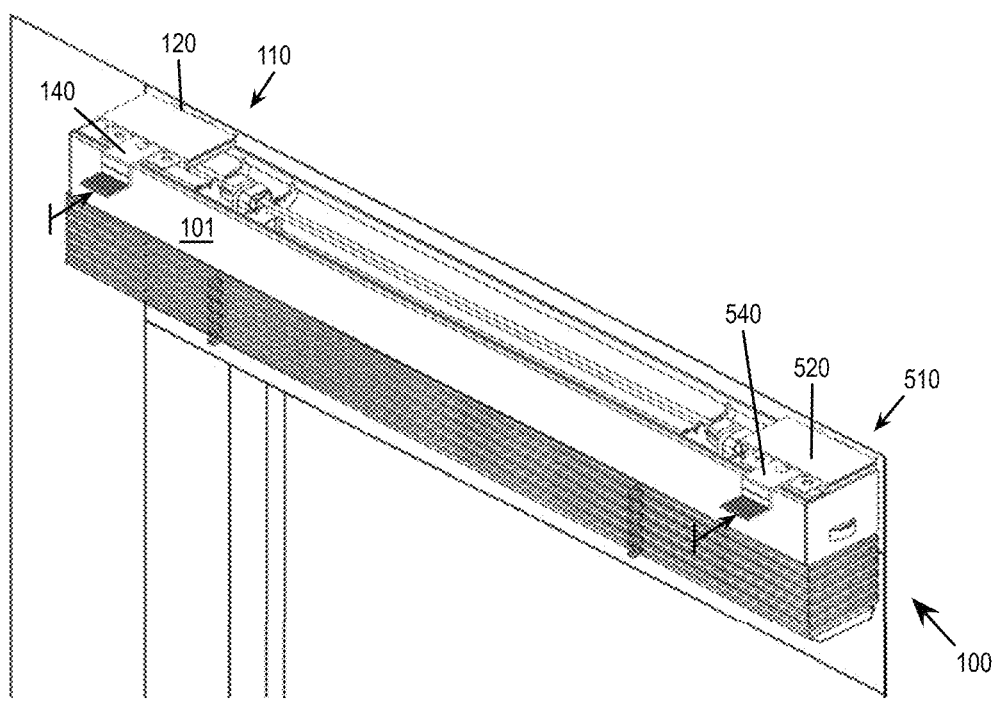

FIGS. 6A-D illustrate mounting the window blind to a wall behind the window blind. The wall being mounted may be outside a window frame (outside mount) or inside a window frame (inside mount). FIG. 6A shows mounting the flex bracket 110 to the wall 503, which is behind the window blind 100 to be installed (Z-direction). The adjustable arm 140 swivels to the perpendicular position and is assembled with the railing segment 120, which serve similar role in the mounting assembly as the spacer 150. FIG. 6B shows the window blind 100 being raised toward the flex bracket 110, and the adjustable arm 140 is in an extended position to receive the headpiece 101 into the embrace of the flex bracket 110. FIG. 6C shows the headpiece 101 in the embrace of the flex bracket 110. The flex bracket 110 is holding the left end of the headpiece 101, and the adjustable arm 140 is still in its extended position. FIG. 6D shows the adjustable arm 140 retracted to constrain or secure the headpiece 101 to the flex bracket 110. The other flex bracket 510 is also mounted to the wall 503 behind the window blind to be installed (Z-direction), and the adjustable arm 540 swivels to the perpendicular position.

Figure 7:
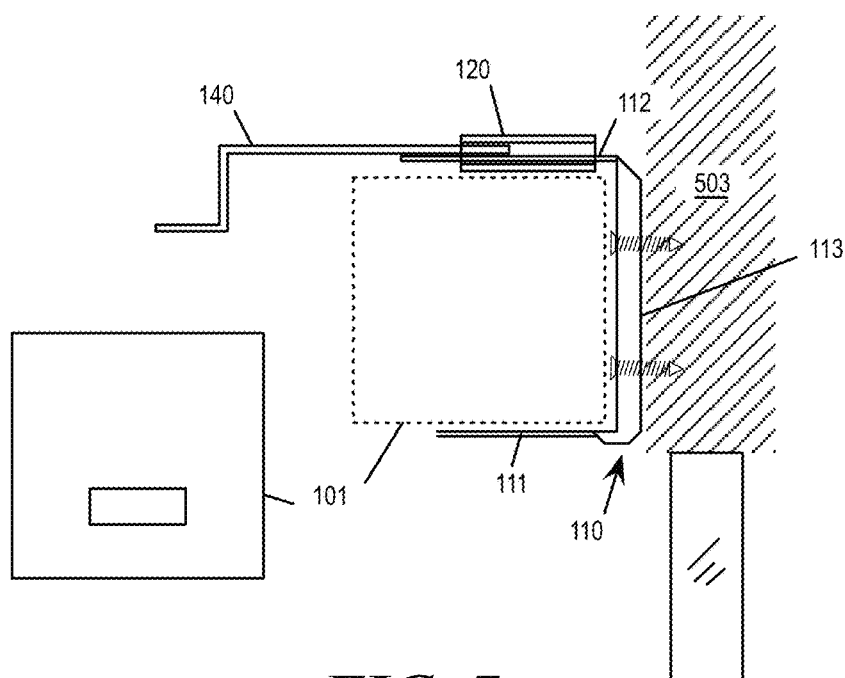
FIG. 7 illustrates a cross-section view of the flex bracket being mounted to the wall or ceiling above the window shade.

The examples of FIGS. 5A-D and FIGS. 6A-D illustrate examples in which the flex bracket 110 is mounted to the walls in the X-direction (left or right) or Z-direction (rear). However, as discuss above by reference to FIG. 2A, the flex bracket 110 can also be mounted to the walls in the Y direction (above). In these instances, the adjustable arm 140 can still swivel in the perpendicular or parallel position, and still extend/retract to hold the headpiece of the window blind in place. FIG. 7 illustrates a cross-section view of the flex bracket 110 being mounted to the wall 503 behind the window shade (Z-direction). The wall 503 may be outside a window frame (outside mount) or inside a window frame (inside mount.) The flex bracket 110 is mounted through its middle plate 113. The adjustable arm 140 is at the perpendicular position and is extended to allow the headpiece 101 to be installed. The headpiece 101 will be constrained to its desired position by the adjustable arm 140 and the middle plate 113 of the flex bracket 110.

Figure 8:
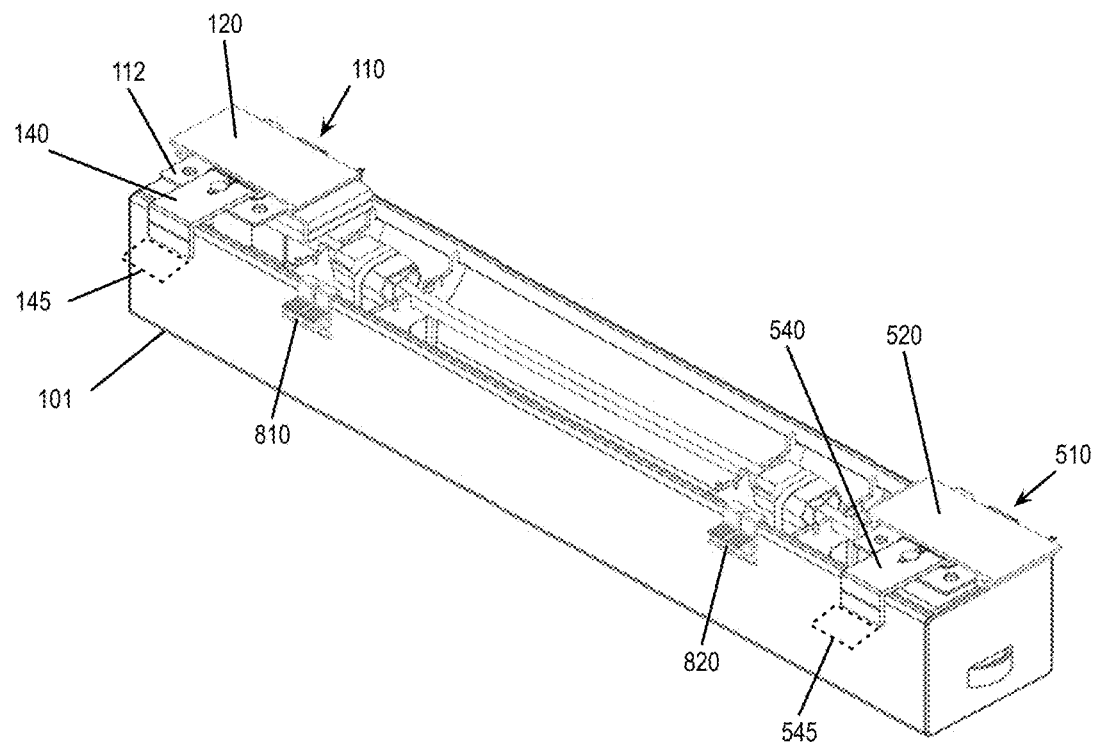
FIG. 8 illustrates an installed headpiece with flex brackets and adjustable arms.

FIG. 8 illustrates an installed headpiece with flex brackets and adjustable arms. The two ends of the headpiece 101 are supported by the supporting bracket 110 and 510 and are held in place by the adjustable arms 140 and 540, which are in their perpendicular positions. The handling taps 145 and 545 of the adjustable arms 140 and 540 have been removed. The mounting system 105 may provide additional components for supporting other parts of the installed window blind. For example, optional support clips 810 and 820 can be attached to the headpiece 101 to support an ornamental façade for the blind.

In embodiments described by reference to FIGS. 2-8, the adjustable arm 140 adapt to the shape and dimension of the headpiece by extending to receive the headpiece and retracting to constrain or secure the headpiece at the flex bracket 110. In some other embodiments, the adjustable arm 140 is not used, and a railing segment having fixed bottom rails (or a spacer with fixed arms) is used to constrain the headpiece of the window blind. Specifically, the railing segment has a recess cavity to receive the top plate 112 of the flex bracket and two bottom rails to hold the headpiece in place.

Figure 9A:
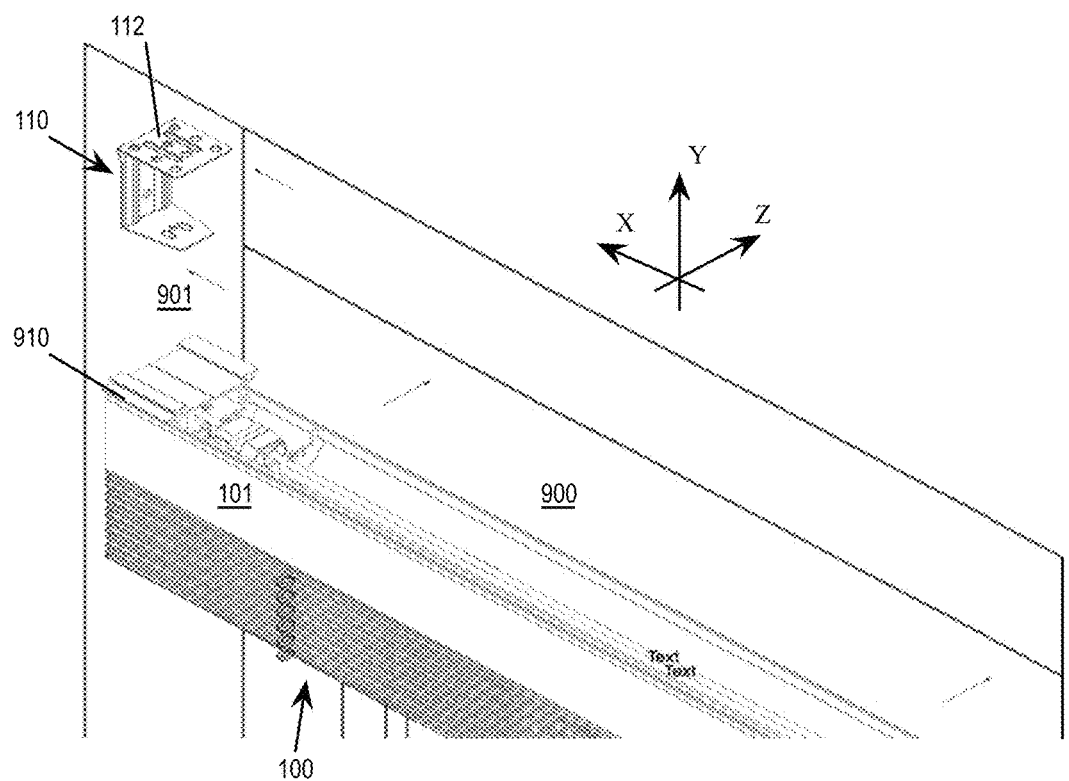
FIGS. 9A-B illustrate the mounting of a window blind using railing segment with fixed side rails.
Figure 9B:
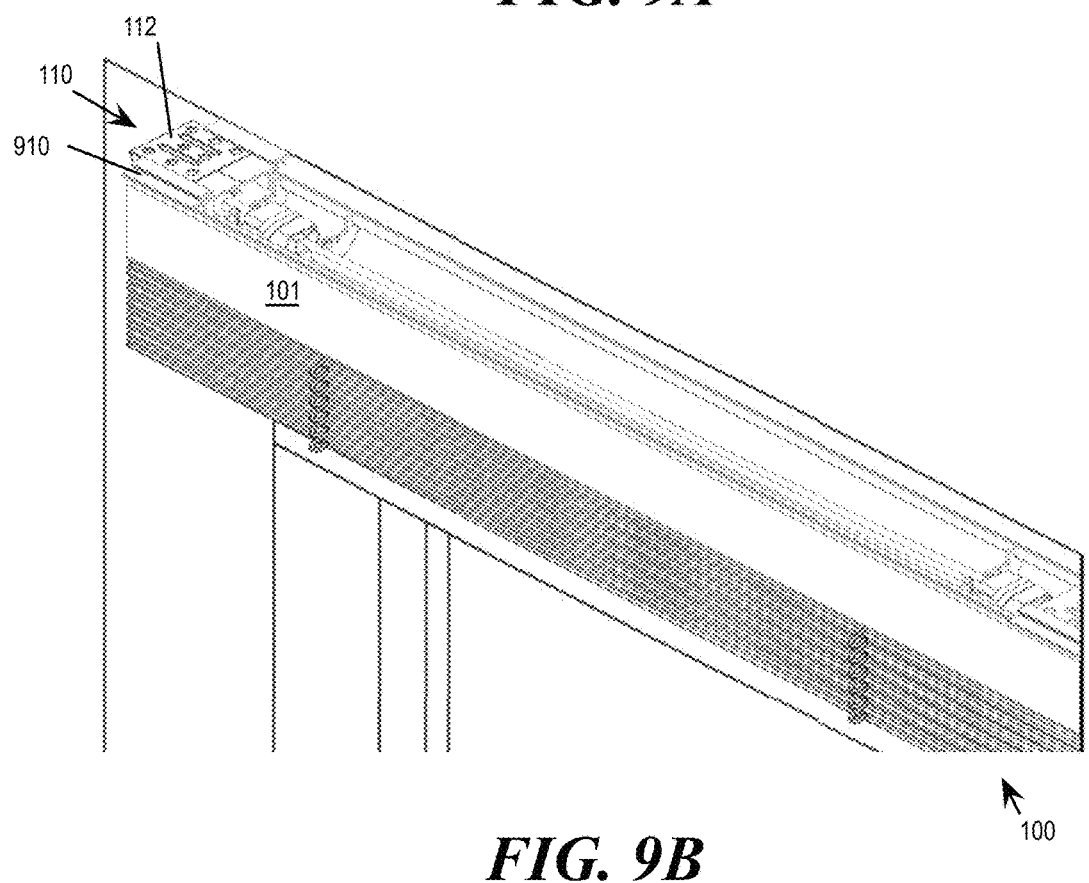

FIGS. 9A-B illustrate the mounting of a window blind using railing segment with fixed side rails. FIG. 9A shows the flex bracket 110 is mounted to a wall surface 901. A railing segment 910 having two bottom rails is placed over the headpiece 101 of the window blind 100. The two bottom rails limit the movement of headrail 101 and the railing segment 910 relative to each other. The railing segment 910 also has two top rails that forms a recess cavity for receiving the top plate 112 of the flex bracket.

FIG. 9B shows a headpiece 101 being placed into the embrace of the flex bracket 110. Thus, the position of the headpiece 101 in the Y-direction (up and down) and in the X-direction (left and right) is fixed by the flex bracket 110. The top plate 112 of the flex bracket 110 is inserted into the recess cavity of the railing segment 910. Thus, the movement of the headpiece 101 in the Z-direction (toward or away from the window 900) is also fixed by the railing segment and its bottom rails.

FIGS. 10A-C illustrate using a railing segment with bottom rails and top rails to constrain or secure a headpiece to a flex bracket. FIG. 10A shows the railing segments and the flex brackets used to mount a window blind in a perspective view. The railing segment 910 is used to affix the left end of the headpiece 101 to the flex bracket 110, while another railing segment 920 is used to affix the right end of the headpiece 101 to the flex bracket 510. The railing segments 910 and 920 are identical or similar parts. The railing segment 910 has two top rails 911 and 912 and two bottom rails 916 and 917. FIG. 10B shows a cross-section view of the railing segment 910. As illustrated, the two top rails 911 and 912 are T-shaped and form a recess cavity 915. The two bottom rails 916 and 917 are J-shaped and positioned to match the internal dimension of the headpiece 101. FIG. 10C shows a side elevation view of the railing segment 910 and the flex bracket 110 after the headpiece 101 is installed. As illustrated, the top plate 112 is inserted into the recess cavity 915 formed by the two top rails 911 and 912. The two bottom rails 916 and 917 abuts the interior surfaces of the headpiece 101 to hold the headpiece 101 in place.

The casing of the headpiece 101 has lips 131 and 132 that curls inward. In some embodiments, the J-shaped bottom rails 916 and 917 of the railing segment 910 are configured to hook on to the curling lips 131 and 132. In some embodiments, the railing segment 910 may have other features such as a T-shaped supplemental bottom rail 919 under the railing segment 910. Such a supplemental bottom rail may be used to mate with certain support structures of a window blind.

A railing segment used for affixing the headpiece may have a different shape than the railing segment 910. For example, in some embodiments, the railing segment may have bottom rails that are configured to abut the exterior surface of the headpiece rather than the interior surface. FIGS. 11A-C illustrate a railing segment that constrains the headpiece to the flex bracket by having bottom rails that abut the exterior surface of a headpiece casing.

FIG. 11A shows the railing segments and the flex brackets used to mount a window blind in a perspective view. The railing segment 1110 is used to affix the left end of the headpiece 101 to the flex bracket 110, while another railing segment 1120 is used to affix the right end of the headpiece 101 to the flex bracket 510. The railing segments 1110 and 1120 are identical or similar parts. The railing segment 1110 has two top rails 1111 and 1112 and two bottom rails 1116 and FIG. 11B shows the railing segment 1110 having bottom rails 1116 and 1117 that are configured to abut the exterior surface of the headpiece 101. The railing segment 1110 has two top rails 1111 and 1112 that forms a recess cavity 1115 that is configured to receive the top plate 112. Specifically, the recess cavity 1115 of the railing segment 1110 is formed by a flat plate 1113 and two inward protrusions 1118 and 1119 above the flat plate 1113. In some embodiments, the flat plate 1113 of the railing segment 1110 is configured to span across the headpiece and connect the two the guide rails 1116 and 1117. In some embodiments, the recess cavity 1115 is not center aligned. Specifically, the center of the recess cavity 1115 is not aligned with the center of the space between the two guide rails, and therefore not aligned with the center of the headpiece casing 101 to be installed.

FIG. 11C shows the headpiece 101 being embraced by the flex bracket 110 and the top plate 112 is inserted into the recess cavity 1115. The flex bracket 110 therefore affixes the rail segment 1110, whose bottom rails 1116 and 1117 in turn affix the headpiece 101 by abutting its exterior surfaces.

Figure 12A:
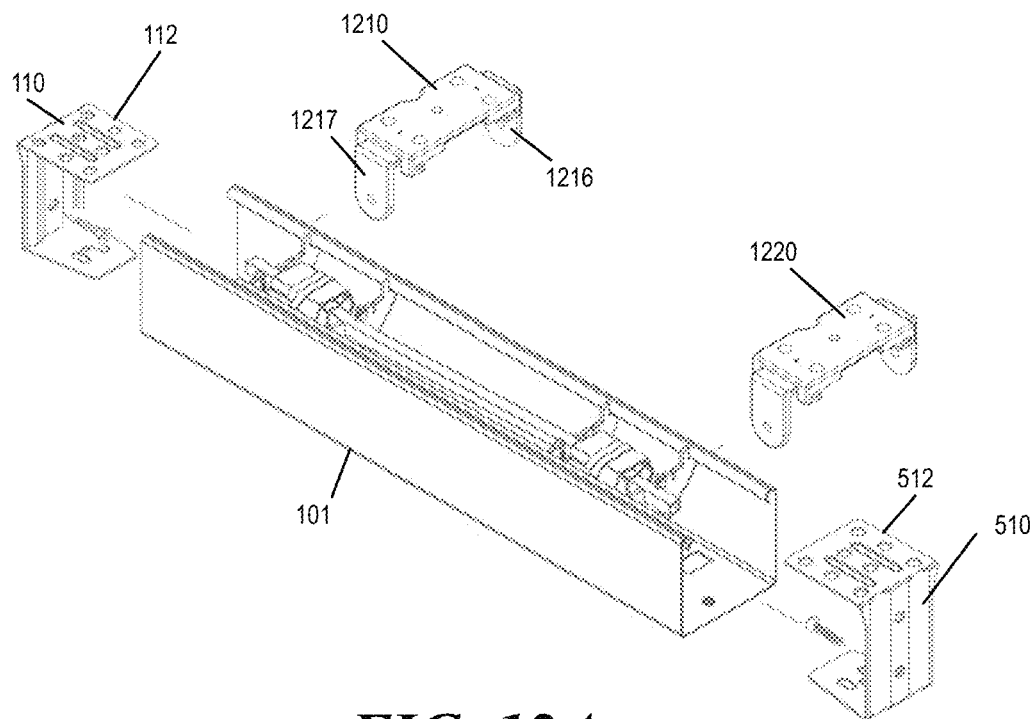
FIGS. 12A-C illustrate using spacers having two arms to affix a headpiece to a flex bracket.
Figure 12B:
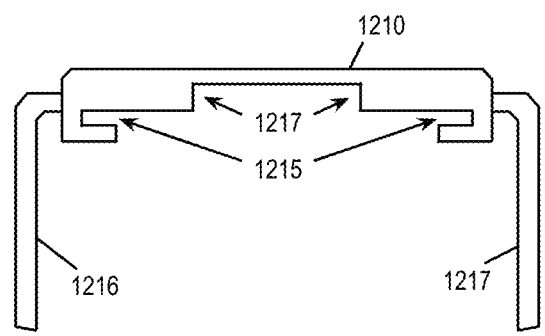
Figure 12C:
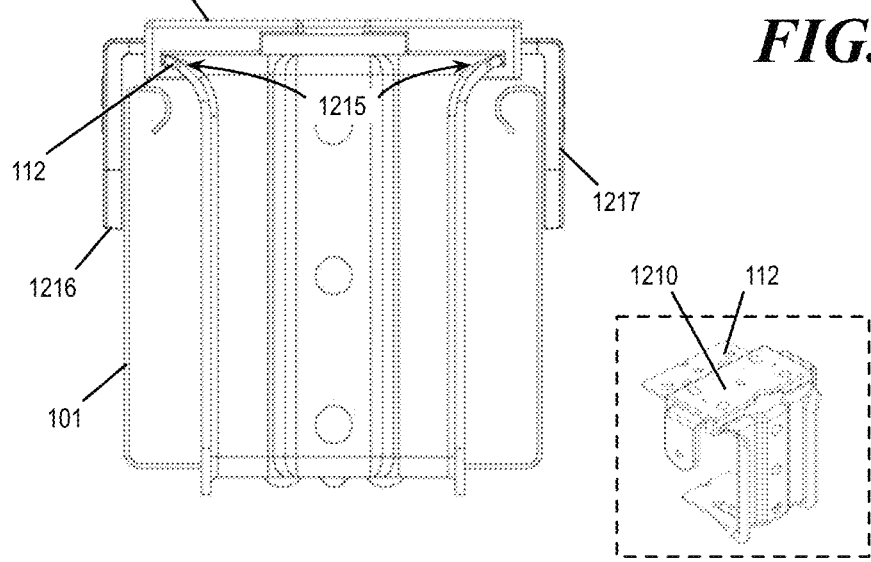

In some embodiments, a spacer with two arms that abut the exterior surfaces of the headpiece is used to constrain the headpiece to the flex bracket. FIGS. 12A-C illustrate using spacers having two arms to affix a headpiece to a flex bracket. FIG. 12A shows spacers and flex brackets being used to mount a window blind in a perspective view. A spacer 1210 is used to affix the left end of the headpiece 101 to the flex bracket 110, while another spacer 1220 is used to affix the right end of the headpiece 101 to the flex bracket 510. FIG. 12B shows a cross-section view of the spacer 1210, which has two arms 1216 and 1217. The two arms 1216 and 1217 are configured to abut the exterior surface of the headpiece 101. The spacer 1210 also has a recess cavity 1215 that is configured to receive the top plate 112 of the flex bracket 110. In some embodiments, the spacers 1210 and 1220 are replicate parts of the spacer 150 (except that spacer 1210 and 1220 each has two arms). For example, the spacer 1210 has a first recess cavity 1215 that is identical to the recess cavity 155 and a recess cavity 1217 that is identical to the recess cavity 157. FIG. 12C shows a side elevation view of the spacer 1210 and the flex bracket 110 after the headpiece 101 is installed. As illustrated, the top plate 112 of the flex bracket 110 is inserted into the recess cavity 1215. The two spacer arms 1216 and 1217 abuts the exterior surfaces of the headpiece 101 to hold the headpiece 101 in place.

In some embodiments, a first (backstop) railing segment with a sidewall is used to provide a backstop for the headpiece, while a second (constraining) railing segment with two guide rails is used to constrain the headpiece to the flex bracket.

FIGS. 13A-C show backstop railing segments and locking railing segments that are mated with flex brackets for mounting a window blind. The figures illustrate the railing segments 120 and 1110 mated with the flex bracket 110 (and railing segments 510 and 1120 mated with the flex bracket 520) for installing the window blind headpiece casing 101.

In this example, the railing segment 120 is used as the backstop railing segment, which has a recess cavity 125 for mating with the top plate 112 of the flex bracket 110. Once the railing segment 120 has mated with the flex bracket 110, the optional arm 122 of the railing segment 120 becomes the sidewall or backstop to the headpiece being installed. The railing segment 1110 is used as the locking railing segment, which has a recess cavity 1115 for mating with the top plate 112 to fix the railing segment 1110 to the flex bracket 110. Once the railing segment 1110 has mated with the flex bracket 110, the two bottom rails 1116 and 1117 of the railing segment 1110 abut the exterior surfaces of headpiece casing 101 to hold it in place.

In these figures, one end of the headpiece is in the embrace of the flex bracket 110 while another end of the headpiece is in the embrace of the flex bracket 510. The railing segment 520 (a backstop railing segment) and the railing segment 1120 (a locking railing segment) have already mated with the flex bracket 510.

FIG. 13A shows the railing segments 120 and 1110 not yet mated with the flex bracket 110. FIGS. 13B and 13C show the railing segments 120 and 1110 having mated with the flex bracket 110 from opposite perspectives. The railing segments 520 and 1120 have already mated with the flex bracket 510.

Figure 14B:
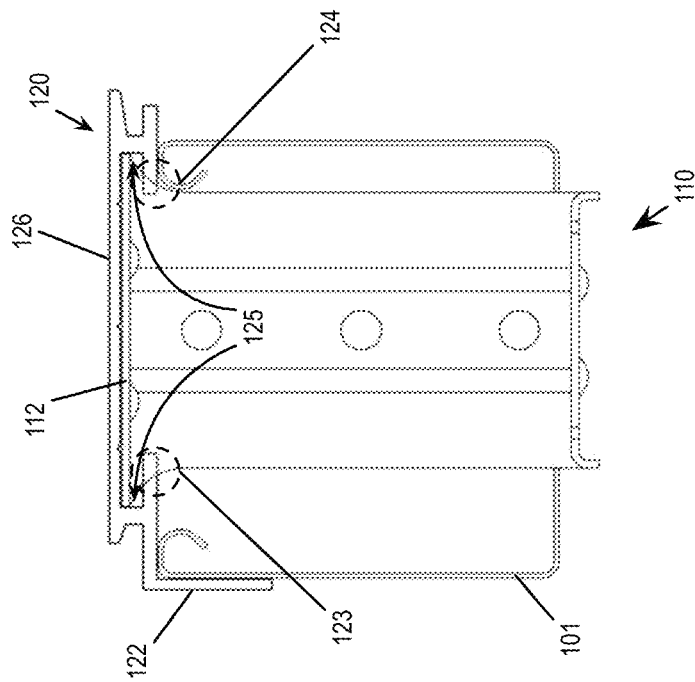
FIGS. 14A-B show a cross-section view of the flex bracket 110 and the backstop railing segment 120 as the headpiece 101 is being installed.
Figure 14A:
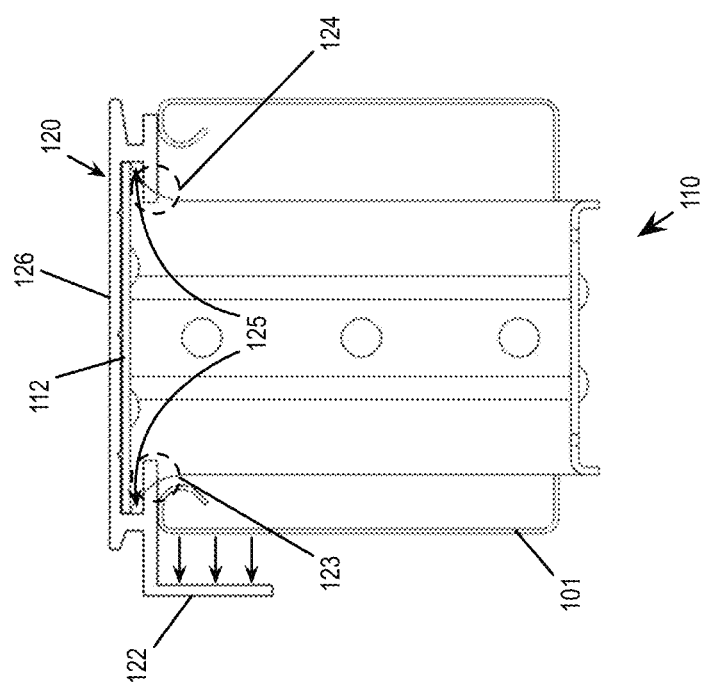

FIGS. 14A-B show a cross-section view of the flex bracket 110 and the backstop railing segment 120 as the headpiece 101 is being installed. FIG. 14A shows the headpiece 101 entering the embrace of the flex bracket 110 but has not reach the backstop (the sidewall or optional arm 122) of the railing segment 120. FIG. 14B shows the headpiece 101 being pushed further until stopped by the sidewall 122.

As illustrated in the cross-sectional views, the recess cavity 125 is formed by a flat plate 126 and two inward protrusions 123 and 124 below the flat plate 126. The flat plate 126 is configured to span across the width of flex bracket 110. In the figure, the recess cavity 125 has mated with the top plate 112 of the flex bracket 110 to fix the railing segment 120 to the flex bracket 110. In some embodiments, the recess cavity 125 is not center aligned. For example, the center of the recess cavity 125 is not aligned with the center of the flat plate 126. Also, the center of the recess cavity 125 is not configured to align with the center of the headpiece 101 (The length between the center of the recess cavity 125 and the sidewall 122 is greater than the length between the center of the headpiece casing and the exterior surface of the headpiece casing. This allows the headpiece 110 to be pushed deeper until reaching the backstop 122.)

Figure 15A:
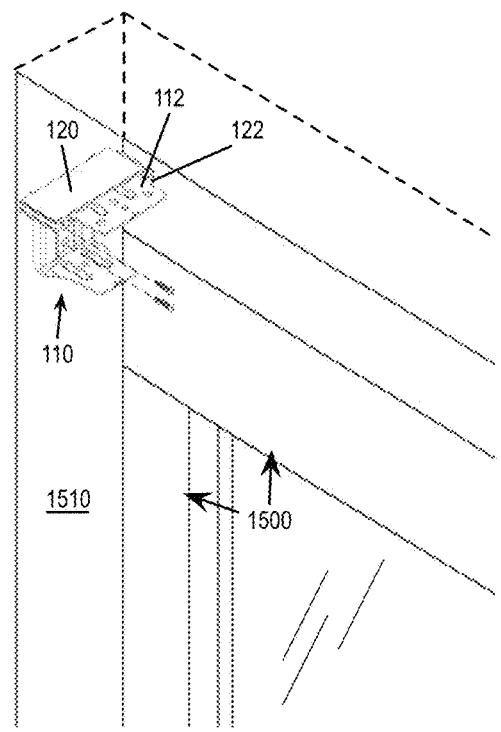
FIGS. 15A-D show the installation of the window blind using the backstop and locking railing segments.
Figure 15B:
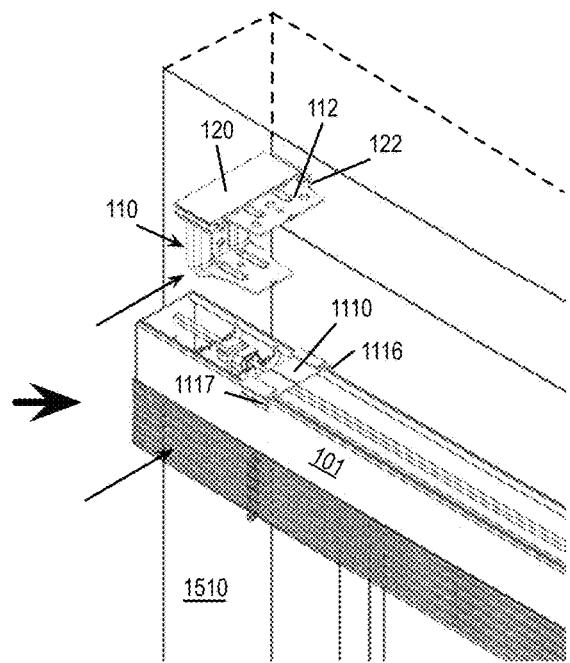

FIGS. 15A-D show the installation of the window blind using the backstop and locking railing segments. FIG. 15A shows the flex bracket 110 being mounted to a vertical surface 1510 in the window frame 1500. When installing the window blind, the flex bracket 110 is mounted to a wall surface, and the backstop railing segment 120 is mated with the flex bracket 110. FIG. 15B shows the headpiece casing 101 being pushed into the embrace of the flex bracket 110. The locking railing segment 1110 is placed over the headpiece casing and free to slide along but constrained by the two bottom rails 1116 and 1117 as guide rails. Since the two bottom rails 1116 and 1117 positioned at the exterior of the headpiece casing 101, the machineries of the window blind inside the headpiece casing would not interfere with the sliding motion of the locking railing segment 1110.

Figure 15D:
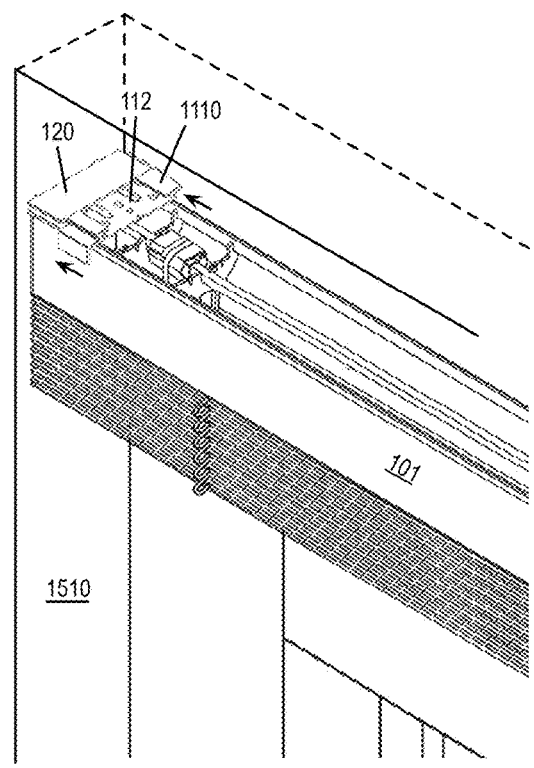
Figure 15C:
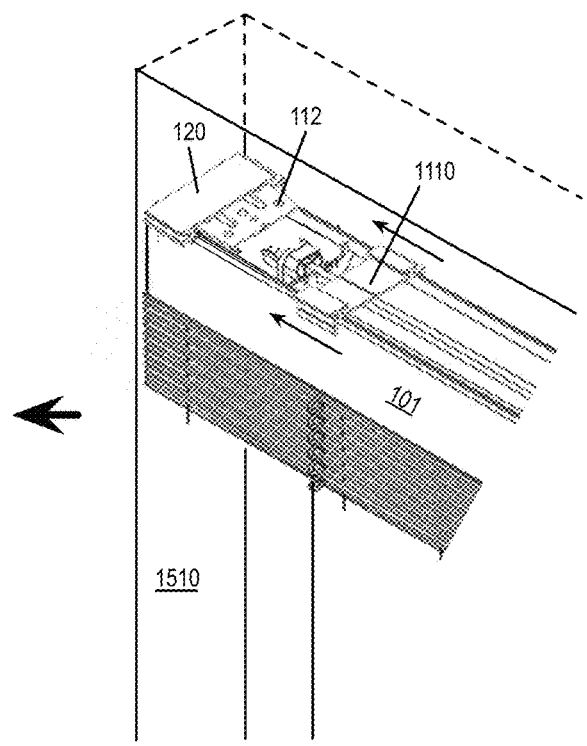

When the headpiece is pushed into the embrace of the mounted flex bracket 110, the sidewall 122 of the backstop railing segment 120 prevents the headpiece from falling off the embrace. In some embodiments, the backstop railing segment 120 has sidewall only on one side so the headpiece can be pushed into the embrace without obstruction. FIG. 15C shows the headpiece casing 101 having been pushed into the embrace of the flex bracket 110. Once the headpiece is pushed in, the locking railing segment 1110 resting on the headpiece 101 can slide over to mate with the flex bracket 110. FIG. 15D shows the locking railing segment 1110 having mated with flex bracket 110. The two guide rails 1116 and 1117 of the locking railing segment 1110 are therefore also fixed, thereby holding the headpiece 101 in place.

The use of the railing segments 120 and 1110 are particularly advantageous for inside mount (when installing a window blind inside a window frame as illustrated in FIGS. 15A-D.) This is because the flat profile of these railing segments allows the headpiece of the window blind to be mounted as close to the top side of the window frame as possible. An installation personnel can secure the window blind to a flex bracket after the headpiece is put in place by sliding the railing segments along the headpiece to mate with the flex bracket.

In some embodiments, the flex bracket 110 can be mounted to a wall surface above by fasteners through the top plate 112 while still allowing the locking railing segment 1110 to slide over to mate with the flex bracket 110. The wall surface being mounted can be a ceiling (outside mount) or inside a window frame (inside mount). FIGS. 16A-E illustrate mounting a window blind using locking railing segments when the flex bracket is fastened to a wall surface above.

Figure 16B:
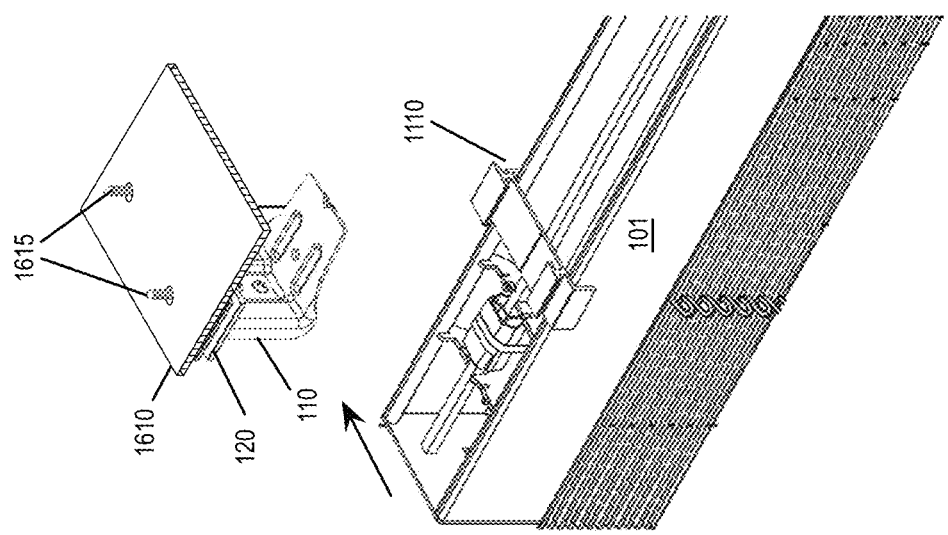
FIGS. 16A-E illustrate mounting a window blind using locking railing segments when the flex bracket is fastened to a wall surface above.
Figure 16A:
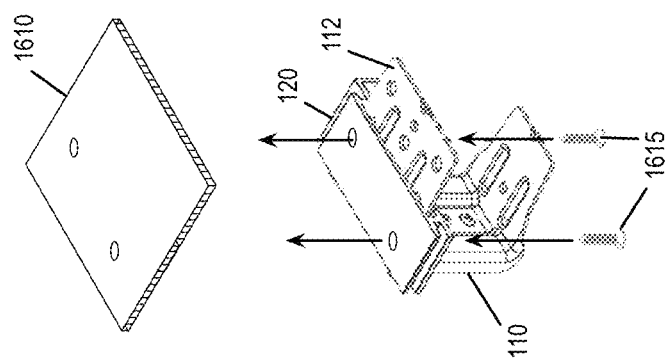

FIG. 16A shows the flex bracket 110 being mounted to a wall above by fasteners 1615. The figure shows the backstop railing segment 120 already mated with the flex bracket 110. The fasteners go through the top plate 112 of the flex bracket, through the flat plate of the railing segment 120 and a spacer 1610. The spacer 1610 ensure that there will be enough room above the headpiece casing for the locking railing segment 1110 to slide along headpiece casing.

Figure 16D:
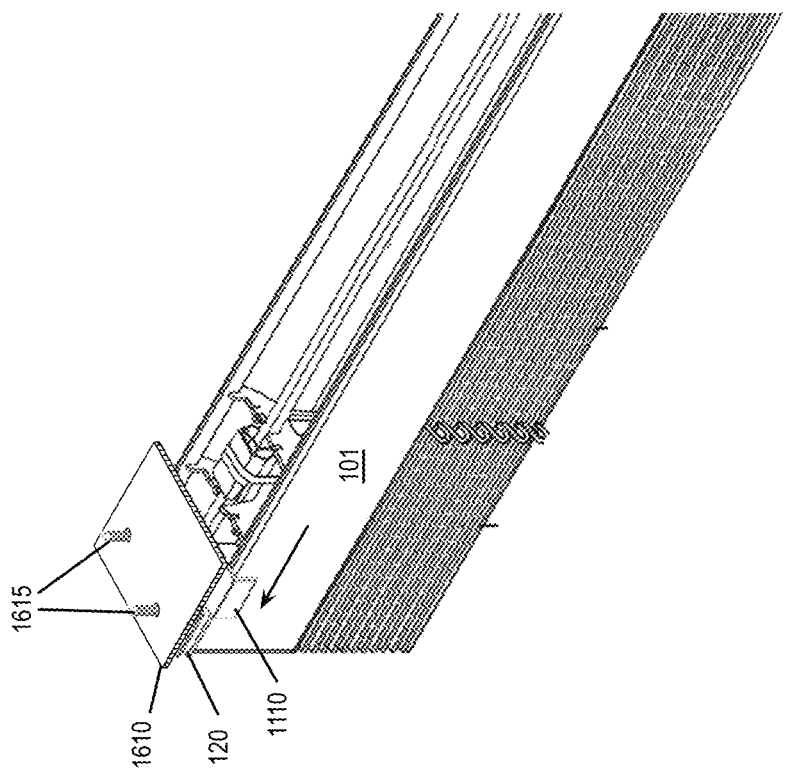
Figure 16C:
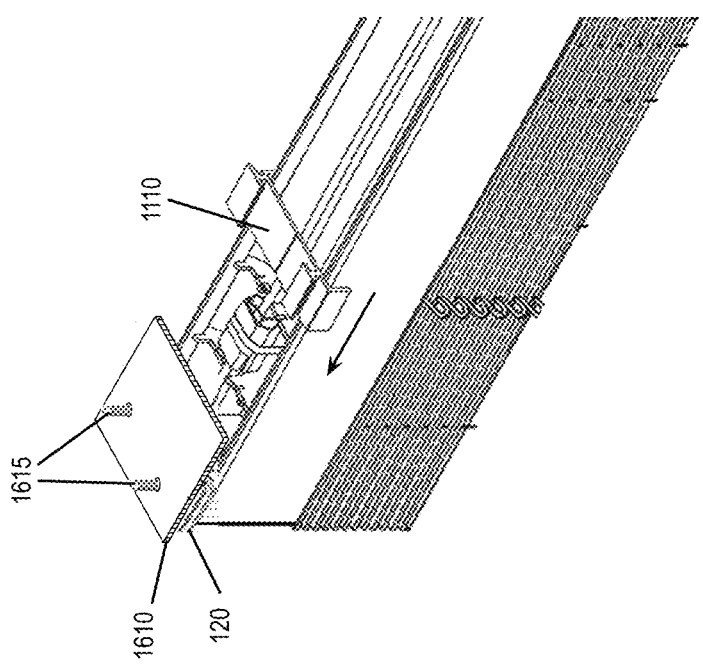

FIG. 16B shows the headpiece 101 with the railing segment 1110 ready to be installed into the embrace of the flex bracket 110. The flex bracket 110 is already mounted to the ceiling by fasteners 1615 through the railing segment 120 and the spacer 1610. The spacer 1610 extend beyond the top surface of the railing device 120. FIG. 16C shows the headpiece 101 in the embrace of the flex bracket 110. FIG. 16D shows the railing segment 1110 slides to mate with the flex bracket 110 beneath the spacer 1610.

Figure 16E:
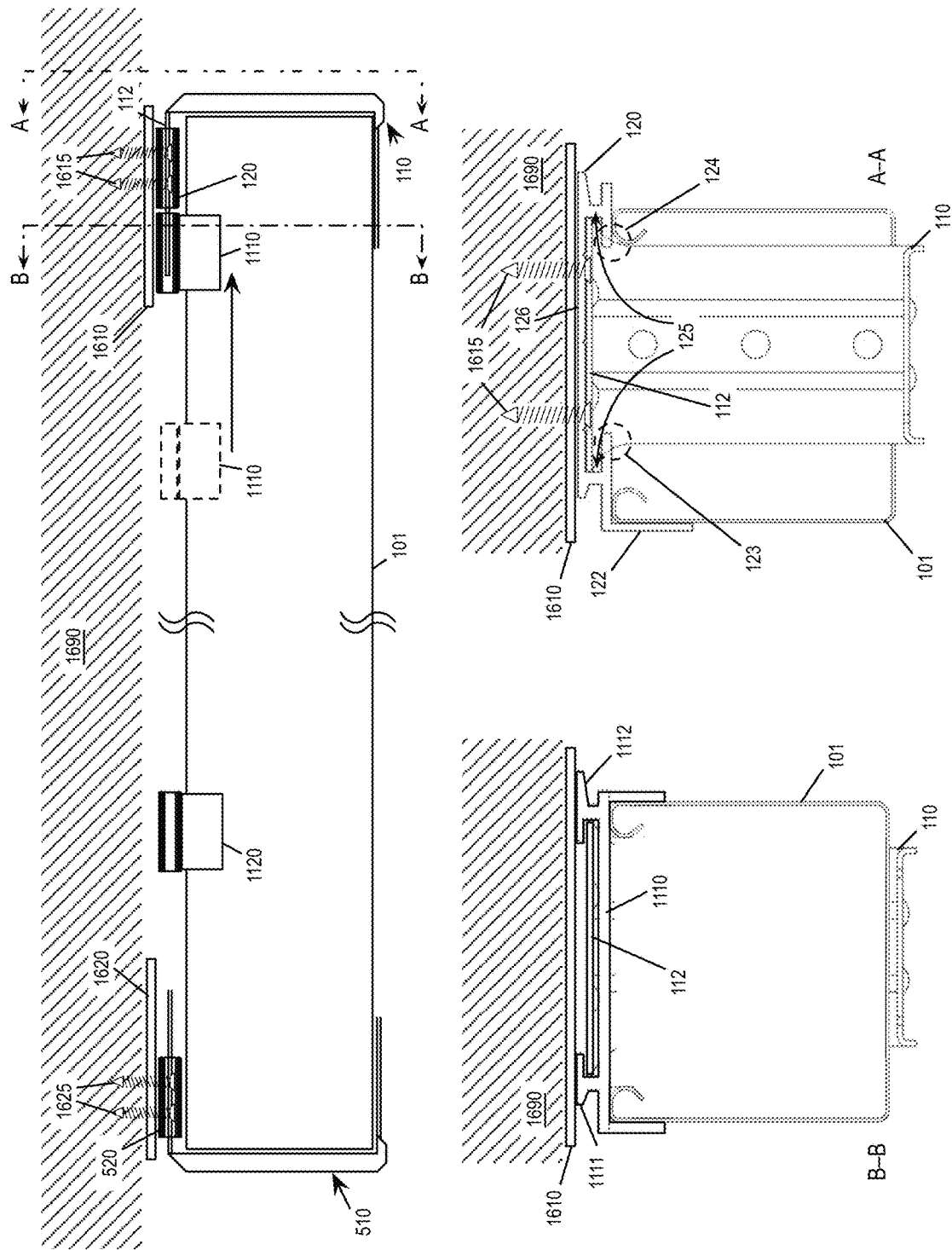

FIG. 16E shows cross-section views of the headpiece 101 when the flex bracket is fastened to a wall 1690 above. As illustrated, the fasteners 1615 go through the top plate 112 of the flex bracket 110, the flat plate of the railing segment 120, and the spacer 1610 to reach the wall 1690. (The fasteners 1625 go through the top plate of the flex bracket 510, the flat plate of the railing segment 520, and the spacer 1620 to reach the wall 1690.) The spacer 1610 (and the spacer 1620) supports a spacing between the headpiece casing 101 and the wall surface 1690. This spacing allows the locking railing segment 1110 to slide along the headpiece casing 101 to mate with the flex bracket 110 (and the locking segment 1120 to slide to mate with the flex bracket 510). When the locking railing segment 1110 slides to mate with top plate 112 of the flex bracket 110, it tucks into the space beneath the spacer 1610. Cross-section A-A shows the view at the backstop railing segment 120 and the cross-section view B-B shows the view at the locking railing segment 1110.

Figure 17A:
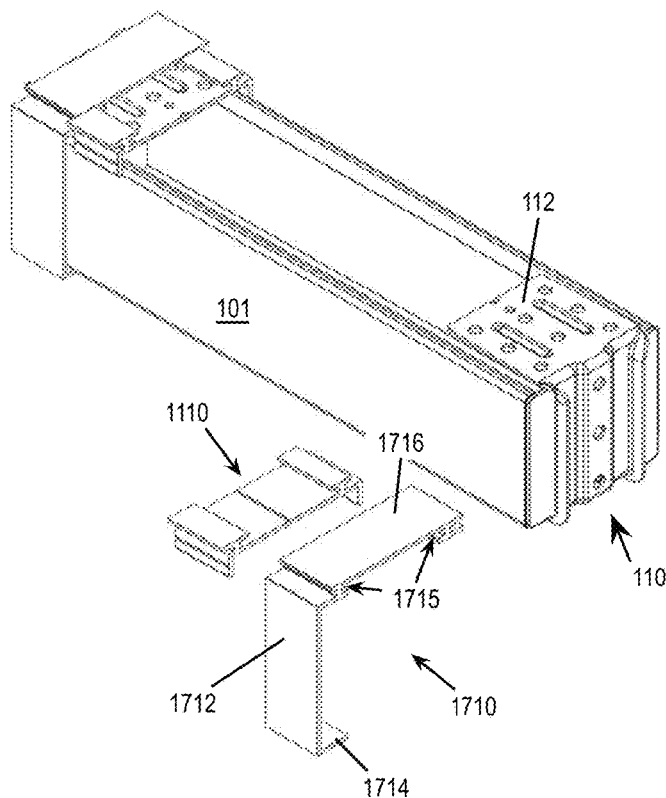
FIGS. 17A-C show a L-shaped railing segment 1710 having an extended sidewall.
Figure 17C:
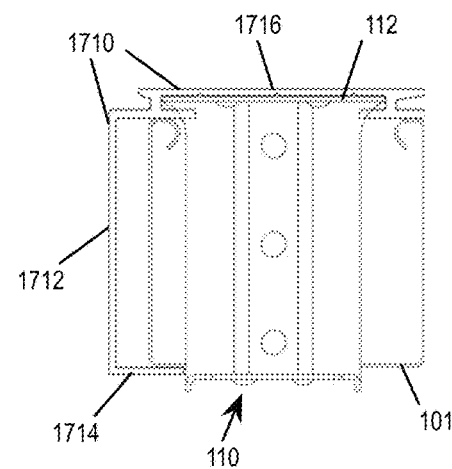
Figure 17B:
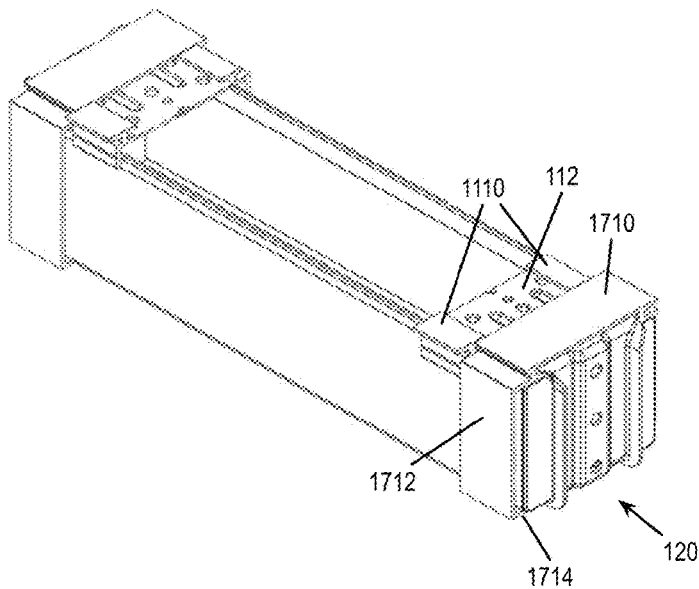

In some embodiments, the backstop railing segment has an extended sidewall that is L-shaped and is configured to abut both a side surface and a bottom surface of the headpiece casing. FIGS. 17A-C show a L-shaped railing segment 1710 having an extended sidewall. As illustrated, the railing segment 1710 has a flat plate 1716, a side plate 1712, and a bottom plate 1714. The side plate 1712 and the bottom plate 1714 are collectively referred to as an extended sidewall. The flat plate 1716 together with two inward protrusions below the flat plate forms a recess cavity 1715 that is configured to mate with the top plate 112 of the flex bracket 110. Like the sidewall 122 of the railing segment 120, the side plate 1712 of the railing segment 1710 serves as a back stop for when the headpiece casing 101 is pushed into the embrace of the flex bracket 110 during installation.

Figure 18C:
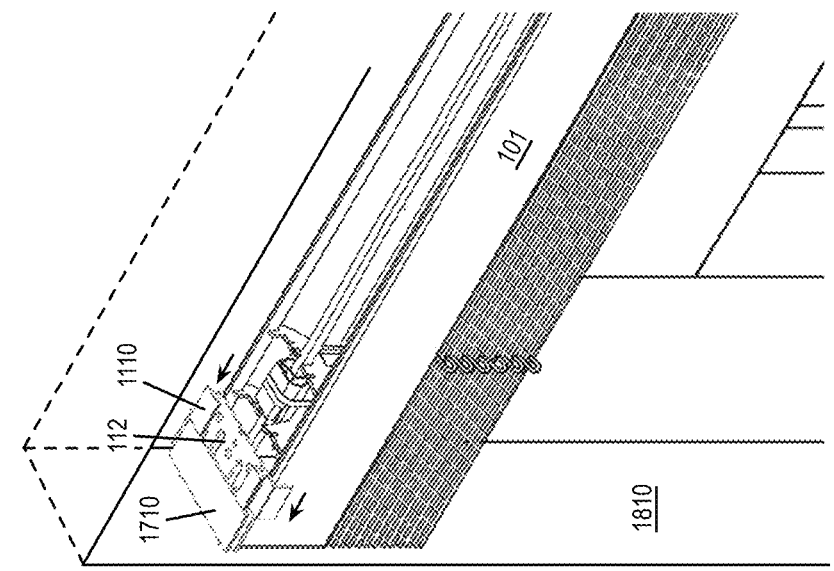
FIGS. 18A-C illustrate installing a window blind using L-shaped railing segments with extended sidewalls.
Figure 18B:
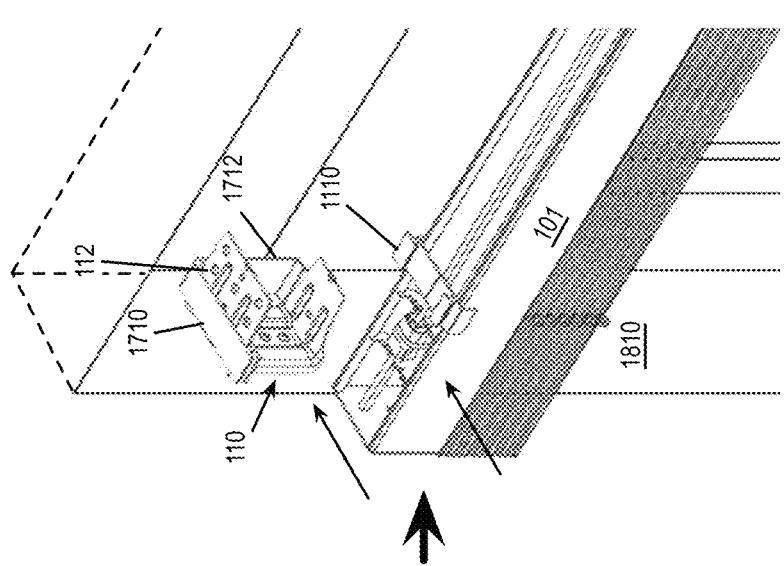
Figure 18A:
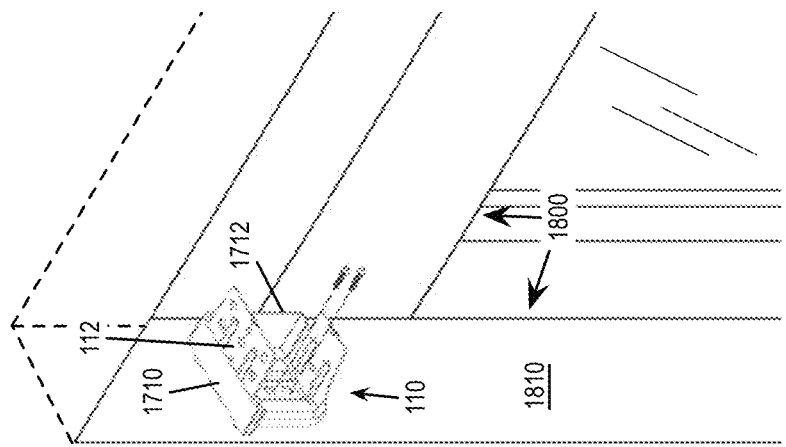

FIGS. 18A-C illustrate installing a window blind using L-shaped railing segments with extended sidewalls. FIG. 18A shows the flex bracket 110 being mounted to a vertical surface 1810 in the window frame 1800 (inside mount). The figure also shows the L-shaped railing segment 1710 already mated with the flex bracket 110. FIG. 18B shows the headpiece casing 101 being pushed into the embrace of the flex bracket 110. The locking railing segment 1110 is placed over the headpiece casing 101 and free to slide along. When the headpiece 101 is pushed into the embrace of the mounted flex bracket 110, the extended sidewall 1712 of the L-shaped railing segment 1710 prevents the headpiece from falling off the embrace. Since the railing segment 1710 has sidewall only on one side, the headpiece can be pushed into the embrace without obstruction. FIG. 18C shows the headpiece casing 101 having been placed into the embrace of the flex bracket 110. Once the headpiece is in place, the locking railing segment 1110 resting on the headpiece 101 can slide over to mate with the flex bracket 110, thereby holding the headpiece 101 in place.

As mentioned, the extended sidewall of the L-shaped railing segment 1710 includes the bottom plate 1714 in addition to the side plate 1712. The bottom plate 1714 allows the railing segment 1710 to form an additional embrace to constrain the headpiece casing, while the side plate 1712 can be fastened to a vertical wall for mounting the flex bracket 110 and thereby the window blind. In some embodiments, a mounting spacer is provided as a buffer or a washer between the extended sidewall of the L-shaped railing segment and the vertical wall. Specifically, the extended sidewall is configured to be fastened to the wall surface through the mounting spacer.

Figure 19B:
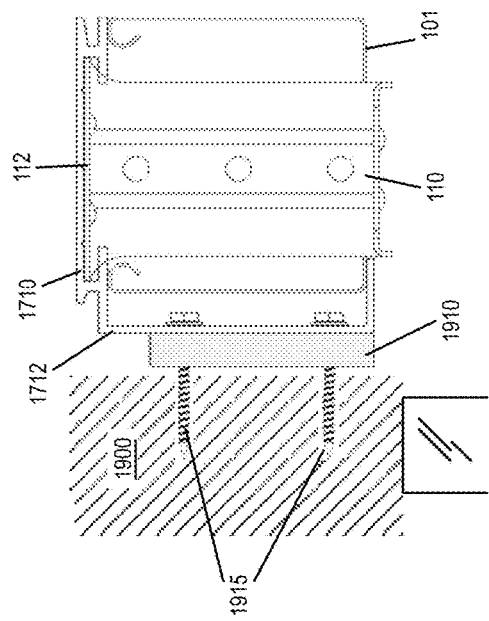
FIGS. 19A-D illustrate using mounting spacers to fasten L-shaped railing segments to a vertical wall 1900.
Figure 19C:
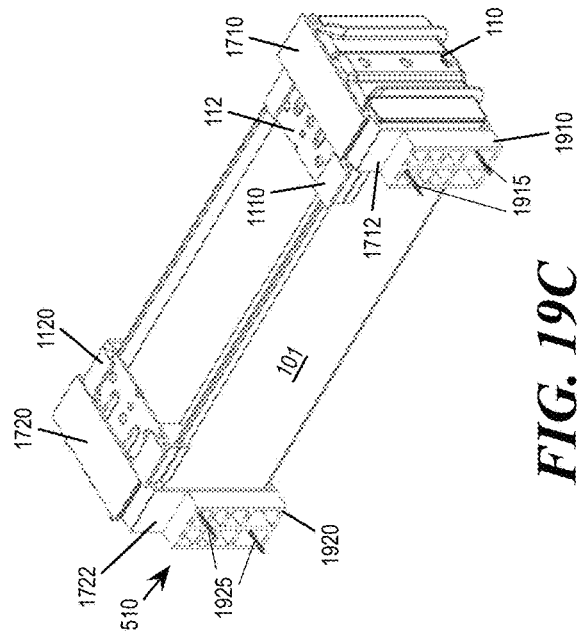
Figure 19A:
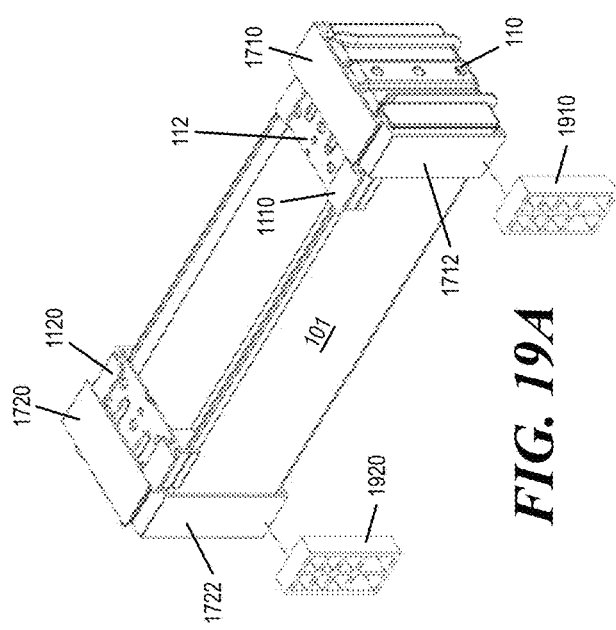

FIGS. 19A-D illustrate using mounting spacers to fasten L-shaped railing segments to a vertical wall 1900. FIG. 19A illustrates mounting spacers 1910 and 1920 being provided for installing the headpiece 101. The headpiece 110 is to be installed using the flex brackets 110 and 510. The flex bracket 110 is mated with the L-shaped railing segment 1710 and the locking railing segment 1110. The flex bracket 510 is mated with a L-shaped railing segment 1720 and the locking railing segment 1120. The spacer 1910 is to be used with the sidewall 1712 of the L-shaped railing segment 1710. The spacer 1920 is to be used with the sidewall 1722 of the L-shaped railing segment 1720.

Figure 19D:
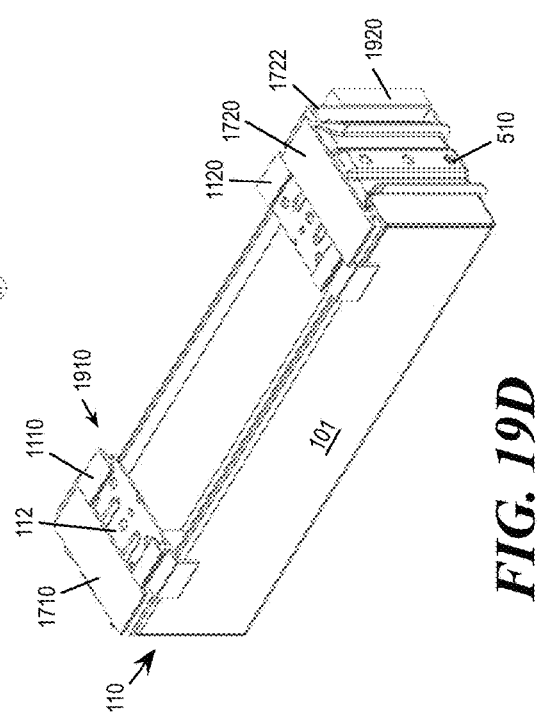

FIG. 19B shows a cross-section view in which fasteners 1915 are used to fasten the L-shaped railing segment 1710 to a vertical wall 1900 through the spacer 1910. The L-shaped railing segment has mated with the flex bracket 110 for installing the headpiece 101. FIG. 19C shows a perspective view of the headpiece 101 in which the fasteners are used to fasten the L-shaped railing segments through mounting spacers. Specifically, the fasteners 1915 are used to fasten the L-shaped railing segment 1710 through the mounting spacer 1910 and the fasteners 1925 are used to fasten the L-shaped railing segment 1720 through the mounting spacer 1920. FIG. 19D shows an opposite perspective view of the headpiece 101 in which the fasteners are used to fasten the L-shaped railing segments through the mounting spacers.

Figures 20A, 20B, 20C:
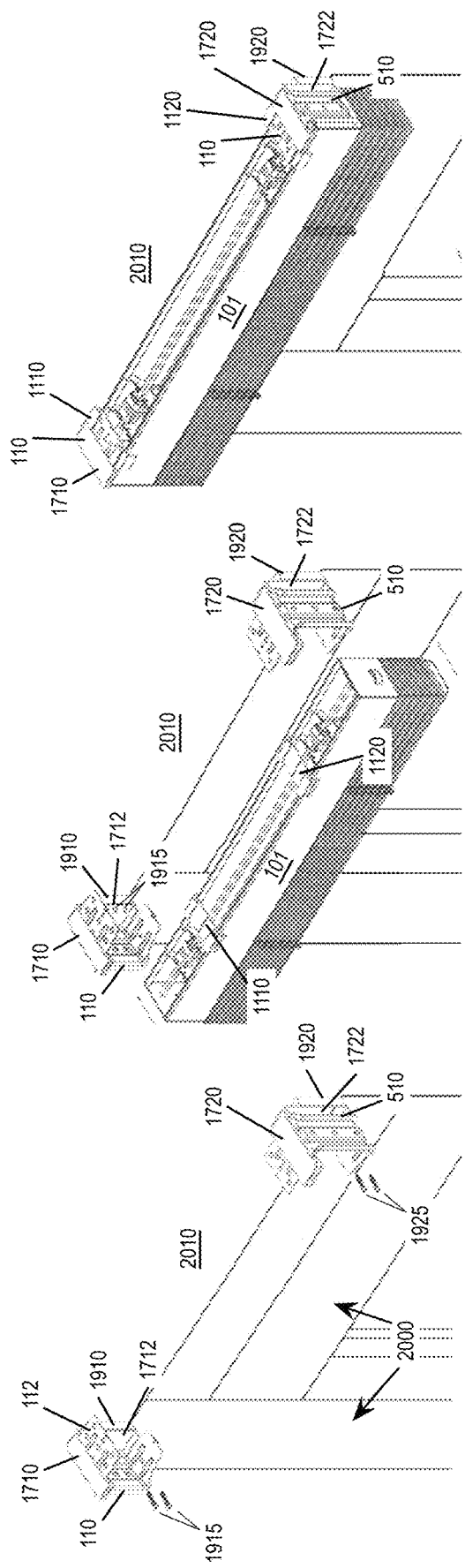
FIGS. 20A-C illustrate using the extended sidewall to mount a window blind to a vertical wall surface outside of a window frame.

In some embodiments, the extended sidewall of a railing segment can be used to mount a window blind to a vertical wall surface outside of a window frame (outside mount). FIGS. 20A-C illustrate using the extended sidewall to mount a window blind to a vertical wall surface outside of a window frame.

FIG. 20A shows the L-shaped railing segments 1710 and 1720 being mounted to a vertical wall 2010. The L-shaped railing segments 1710 and 1720 are also mated with the flex brackets 110 and 510, respectively. The vertical wall 2010 is outside of a window frame 2000. Fasteners 1915 and 1925 are used to fasten the assembly of flex brackets and railing segments at the extended sidewalls 1712 and 1722. The fasteners go through the mounting spacers 1910 and 1920 to evenly distribute pressure to the wall. FIG. 20B shows the headpiece casing 101 being lifted to the flex brackets 110 and 510. The locking railing segments 1110 and 1120 are placed over the headpiece casing 101 and are free to slide along the headpiece 101. FIG. 20C shows the headpiece casing 101 being pushed into the embraces of the flex brackets 110 and 510. The locking railing segments 1110 and 1120 slide over to lock and secure the headpiece casing 101 to the mounted flex brackets 110 and 510. The window blind is then installed at the vertical wall 2010 outside of the window frame 2000 as an outside mount.

Figure 21A:
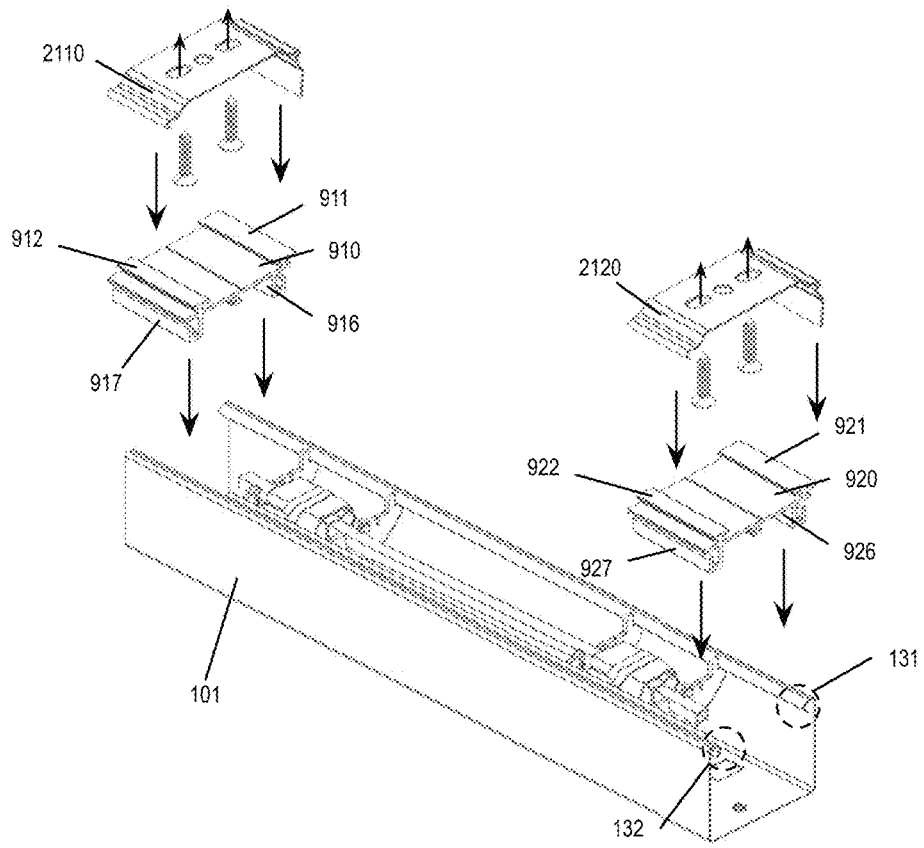
FIGS. 21A-C illustrate using mounting clips and railing segments to mount a window blind.
Figure 21B:
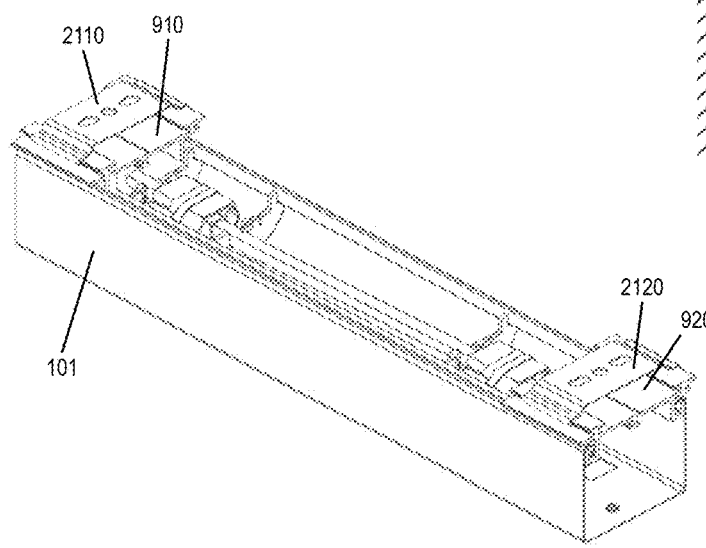
Figure 21C:
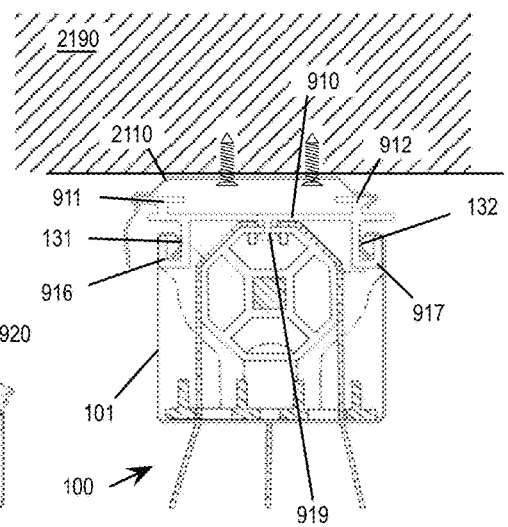

In some embodiments, the flex bracket 110 is not used to mount the headpiece of the window blind to a wall. Instead, a mounting clip is used mount the window blind to a ceiling or a wall above. The mounting clip is configured to snap onto the two top rails of a railing segment (e.g., the top rails 911 and 912 of the railing segment 910). The bottom rails of the railing segments in turn support the weight of the window blind (e.g., the bottom rails 916 and 917 hooking onto the curling lips 131 and 132 of the headpiece 101 as described by reference to FIG. 10C). FIGS. 21A-C illustrate using mounting clips and railing segments to mount a window blind.

FIGS. 21A-B show the mounting clips 2110 and 2120 being mounted upward to the ceiling (not shown). The railing segments 910 and 920 are installed into the headpiece 101, e.g., by sliding the railing segments into the headpiece 101 from both ends. This allows the J-shaped bottom rails of the railing segments (e.g., the bottom rails 916 and 917 of the railing segment 910) to hook onto the curling lips 131 and 132. The installer may then mount the window blind by snapping the railing segments 910 and 920 respectively into the mounting clips 2110 and 2120. The positions of the railing segments 910 and 920 along the headpiece 101 can be adjusted (by e.g., sliding) to match the positions of the mounting clips 2110 and 2120. The mounting clips are made of materials such as stainless steel or other types of metal that can support the weight of the window blind assembly.

FIG. 21C shows a side elevation view of the installed window blind. As illustrated, the mounting clip 2110 is mounted on a wall 2190. The mounting clip 2110 is snapped onto the railing segment 920 at the flanges of the T-shaped top rails 911 and 912. One end of the mounting clip 2110 is longer than the other end. The longer end can be used to release the railing segment from the mounting clip. The J-shaped bottom rails 916 and 917 support the weight of the window blind by hooking onto the curling lips 131 and 132. The J-shaped bottom rails 916 and 917 also constrain the headpiece 101 by abutting the interior surfaces of the headpiece casing 101. The railing segment 910 also includes a supplemental bottom rail 919 that can be used to support or hold up other window blind components.

In the example of FIGS. 21A-B, railing segments with the J-shaped bottom rails are used to hook on the curling lips of the headpiece casing, and thereby support the weight of the window blind. In some other embodiments, railing segments without J-shaped bottom rails can also be used with mounting clips to mount a window blind.

Figure 22A:
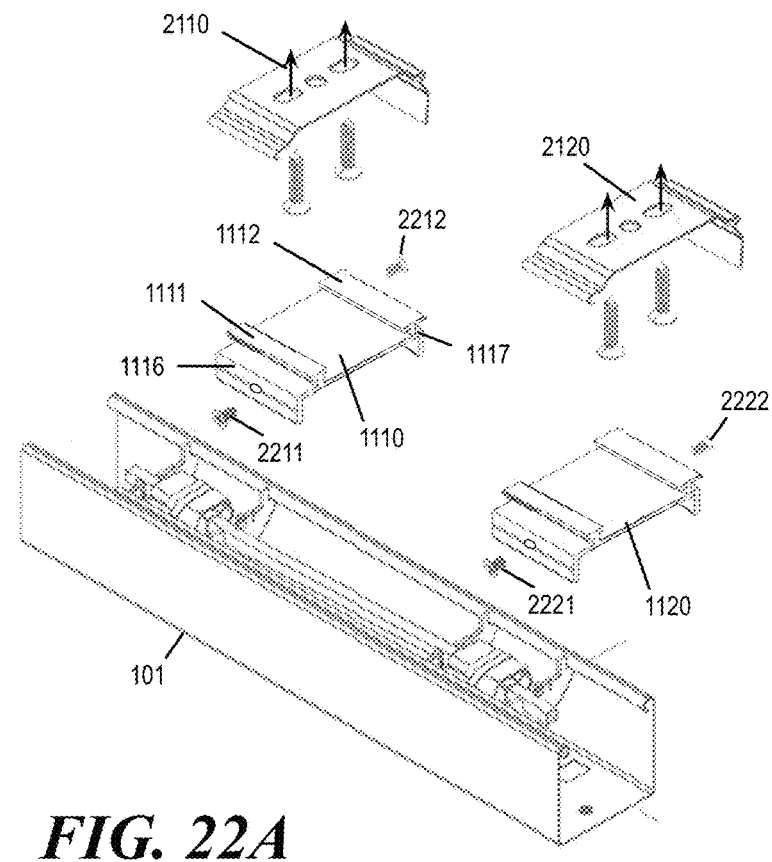
FIGS. 22A-B illustrate railing segments fastened to a headpiece casing for mounting the window blind with mounting clips.
Figure 22B:
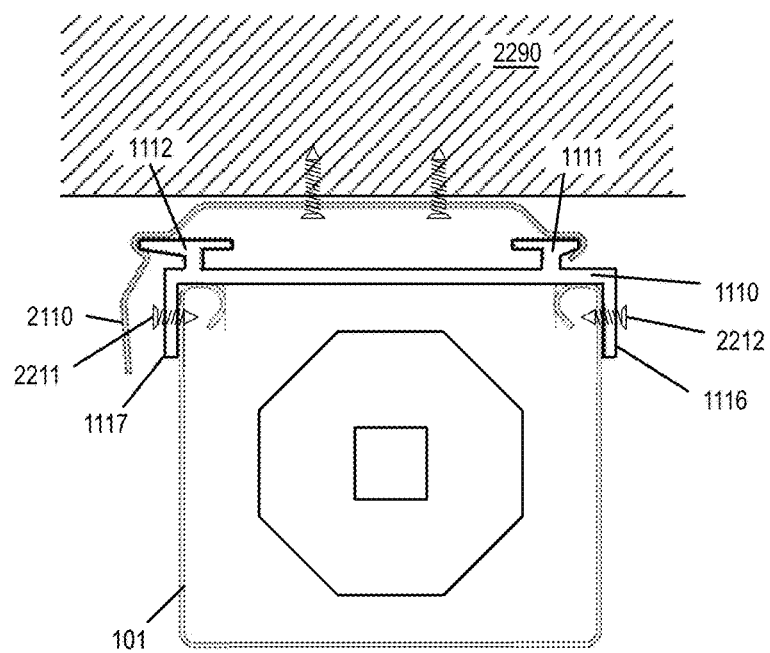

FIGS. 22A-B illustrate railing segments fastened to a headpiece casing for mounting the window blind with mounting clips. As illustrated, railing segments 1110 and 1120 (identical parts) are fastened to the headpiece casing 101, and the window blind can be installed by snapping the top rails of the railing segments 1110 and 1120 to the mounting clips 2110 and 2120. FIG. 22B shows the railing segment 1110 having bottom rails 1116 and 1117 that are configured to abut the exterior surfaces of the headpiece casing 101. The fasteners 2211 and 2212 go through drill holes in the bottom rails 1116 and 1117 to support the weight of the headpiece casing 101 and the window blind. The mounting clip 2110 snaps on to the flanges of the T-shaped top rails 1111 and 1112 to mount the window blind to the wall or ceiling 2290.

Figure 23A:
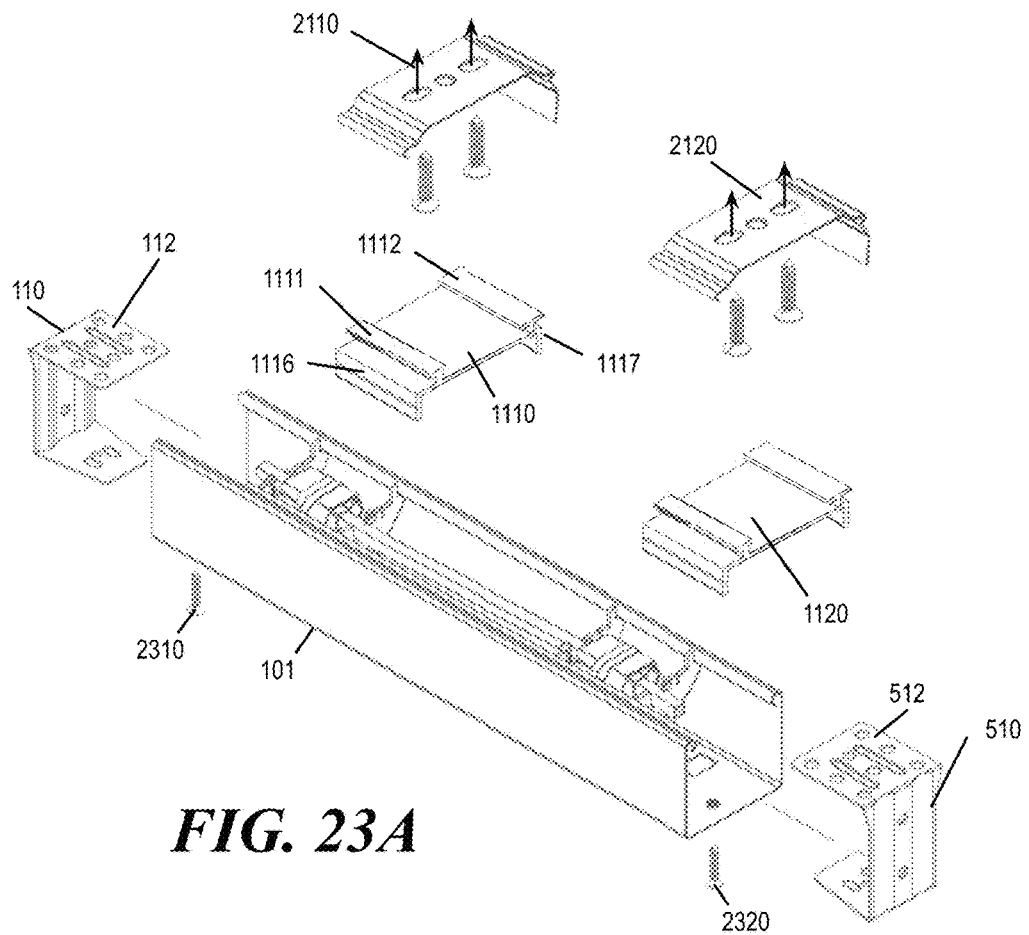
FIGS. 23A-B illustrate using flex brackets that are fastened to a headpiece casing to install a window blind to mounting clips.
Figure 23B:
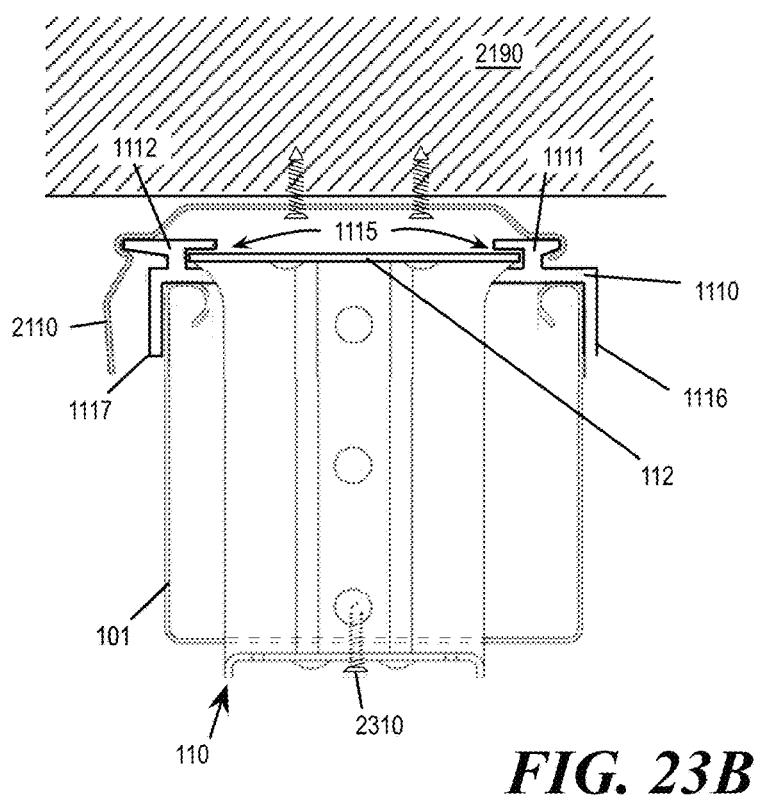

Instead of or in conjunction with fastening the railing segments 1110 and 1120 to the headpiece casing 101, flex brackets can be used to bind the railing segments to the headpiece casing. In some of these embodiments, the flex brackets are not directly mounted to the wall, but instead fastened to the headpiece casing of the window blind. Railing segments mated with the fastened flex brackets can then be used to snap the headpiece casing into mounting clips at the ceiling. Such a railing segment can be the railing segment 1110, which has bottom rails that abut the exterior surface of the headpiece casing. FIGS. 23A-B illustrate using flex brackets fastened to a headpiece casing to install a window blind to mounting clips.

As illustrated, the flex brackets 110 and 510 are fastened to the headpiece 101 of the window blind (by fasteners 2310 and 2320). The railing segments 1110 and 1120 are installed into the headpiece 101. Specifically, the flex brackets 110 and 510 are mated with the railing segments 1110 and 1120. The installer may then mount the window blind by snapping the railing segments 1110 and 1120 respectively into the mounting clips 2110 and 2120. The positions of the railing segments 910 and 920 along the headpiece 101 can be adjusted (by e.g., sliding) to match the positions of the mounting clips 2110 and 2120.

FIG. 23B is a side elevation view of the installed headpiece. As illustrated, the headpiece 101 is embraced by the flex bracket 110 and the top plate 112 is inserted into the recess cavity 1115 of the railing segment. The flex bracket 110 therefore affixes the railing segment 1110, whose bottom rails 1116 and 1117 in turn constrains the headpiece 101 by abutting its exterior surfaces. (Likewise, though not illustrated, the flex bracket 510 affixes the railing segment 1120, whose bottom rails also constrains the headpiece 101 in place by abutting its exterior surfaces.) The T-shaped top rails 1111 and 1112 of the railing segment 1110 are flanged to snap into the mounting clip 2110 to mount the headpiece 101. Though not illustrated, when the flex brackets are fastened to the headpiece casing, railing segments (e.g., 910) with J-shaped bottom rails that abut the interior surfaces of the headpiece casing can also be used to mount the window blind with mounting clips.

In some embodiments, mounting clips (e.g., 2110 and 2120) can be used to mount a window blind to a vertical wall by using L-shaped mounting brackets. The L-shaped mounting brackets are configured to mount a vertical wall surface and while being fastened to by the mounting clips. The fastened mounting clips can in turn snap onto railing devices or railing segments (e.g., 120, 1710, 910, or 1110) with outward protrusions for installing window blinds.

FIGS. 24A-C illustrate mounting a window blind to a vertical wall surface using mounting clips and L-shaped mounting brackets. The figures illustrate the headpiece 101 being mounted to a vertical wall 2400 using L-shaped mounting brackets 2410 and 2420 and mounting clips 2110 and 2120. Such a L-shaped mounting bracket has a first section for fastening to the vertical wall surface and a second section for being fastened to by a mounting clip. (The first and second sections are perpendicular to each other). The L-shaped mounting brackets 2410 and 2420 are fastened to the vertical wall 2400 and the mounting clips 2110 and 2120 are fastened to the L-shaped mounting brackets 2410 and 2420.

The flex brackets 110 and 510 are fastened to the headpiece 101 by fasteners 2320 and 2310. Railing devices 120 and 520 are mated with the flex brackets 110 and 510 and therefore also fixed to the headpiece casing 101. The railing devices 120 and 520 are railing segments having (i) recess cavities (e.g., the cavity 125 formed by inward protrusion 123 and 124) for mating with the top plates of the flex brackets (e.g., the top plate 112 of the flex bracket 110) and (ii) outward protrusions that can be snapped on to by the mounting clips. For example, the railing segment 120 has outward protrusions 127 and 128 that can be snapped onto by the mounting clip 2110. The railing segment 120 (and 520) has a flat plate 126 that is configured to span the width of the headpiece casing, and the two outward protrusions 127 and 128 are two ends of the flat plate. The railing segment 120 has an optional arm 122 that is configured to abut the headpiece casing 101 as a backstop. In some embodiments, railing segments 120 and 520 are fastened to the flex brackets 110 and 510 to provide further stability in the assembly. FIG. 24C illustrates a fastener 2425 being used to fasten the flat plate 126 of the railing segment 120 to the top plate 112 of the flex bracket 110.

Thus, the headpiece casing 101 of the window blind can be installed to the vertical wall 2400 in an outside mount configuration by snapping the railing segments 120 and 520 into the mounting clips 2110 and 2120 (which are fastened to the L-shaped mounting brackets 2410 and 2420).

Figure 25B:
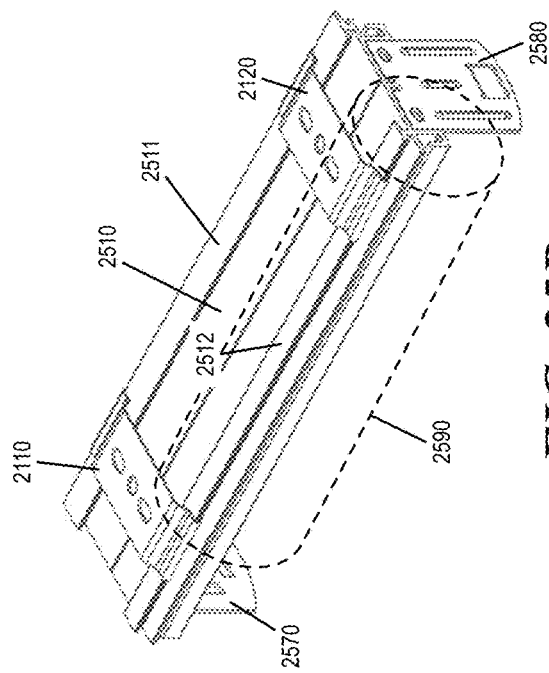
FIGS. 25A-C illustrate a headrail that is used to mount a window blind.
Figure 25C:
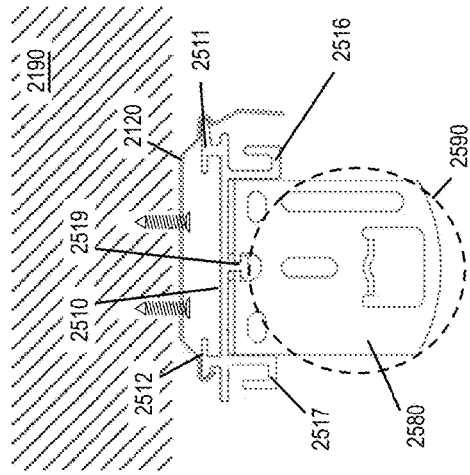
Figure 25A:
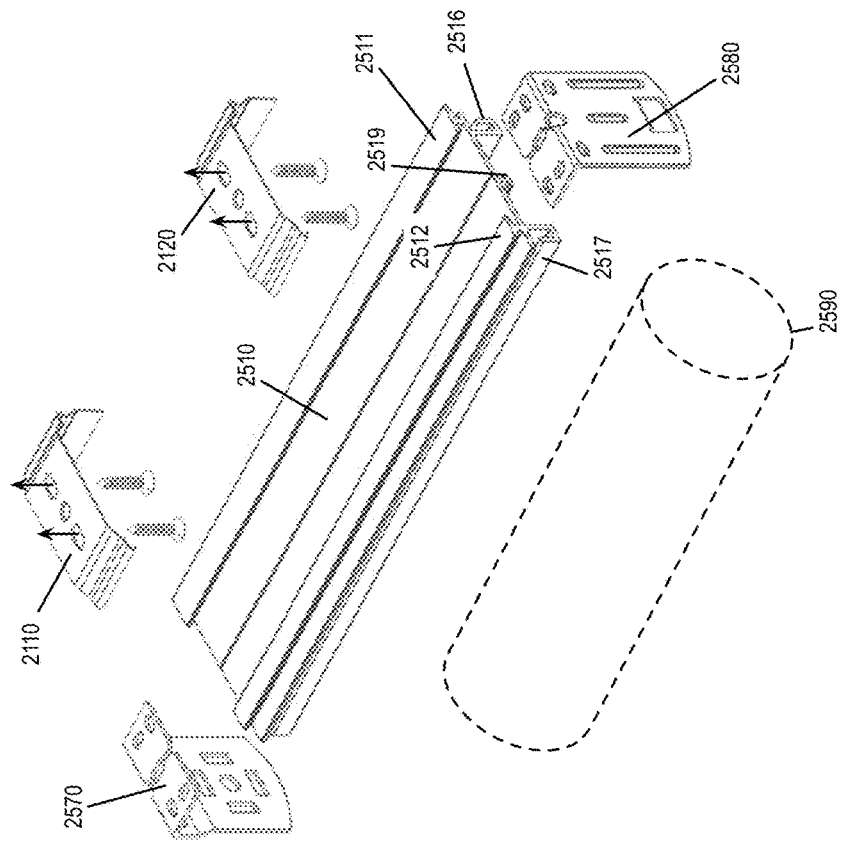

In some embodiments, a headrail that runs the length of a window blind is used for mounting. The headrail may have an identical or similar cross-section as the railing segment 910, i.e., it has two top rails configured to snap into mounting clips and two or more bottom rails for supporting the weight of the window blind. FIGS. 25A-C illustrate a headrail 2510 that is used to mount a window blind 2590. The window blind 2590 may have a headpiece or casing that is similar to the headpiece 101 for cord or other mechanisms. The window blind 2590 may have a roller as a headpiece that is different than the headpiece 101.

FIGS. 25A-B show the mounting clips 2110 and 2120 being mounted upward to the ceiling (not shown). A pair of holder brackets 2570 and 2580 are installed at the two ends of the headrail 2510. The holder brackets 2570 and 2580 are used to hold up the headpiece 2590 (conceptually illustrated by a cylinder in broken lines) of a window blind. The installer may mount the window blind by snapping the headrail 2510 onto the mounting clips 2110 and 2120.

FIG. 25C shows a side elevation view of the installed window blind. As illustrated, the mounting clip 2120 is mounted on a wall 2190. The mounting clip 2120 is snapped onto the headrail 2510 at the top rails 2511 and 2512, which are T-shaped. A T-shaped supplemental bottom rail 2519 of the headrail allows the holder brackets 2580 (and 2570) to latch on the headrail 2510.

Like the railing segment 910, the headrail 2510 has J-shaped bottom rails 2516 and 2517. When the headrail 2510 is used to mount a headpiece casing such as the headpiece 101 (not illustrated), the bottom rails 2516 and 2517, like their counter parts in the railing segment 910, can be used to constrain the headpiece 101 by abutting the interior walls of the headpiece casing. Furthermore, the J-shaped bottom rails 2516 and 2517 can be used to hook on to the curling lips 131 and 132 of the headpiece casing.

Figure 26A:
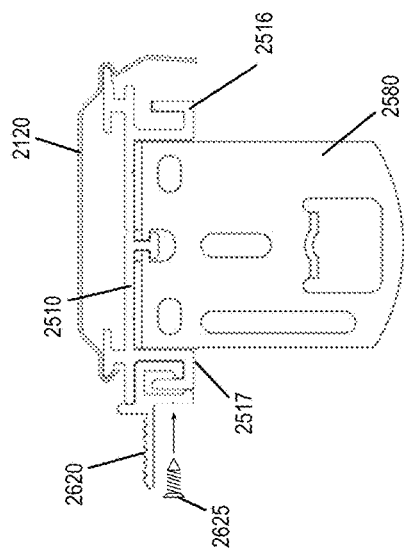
FIGS. 26A-B illustrate latching taps latching onto a J-shaped bottom rail for installing a façade.
Figure 26B:
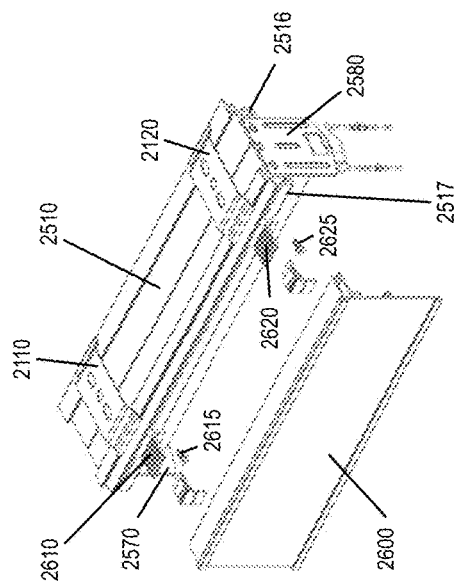

When the headrail 2510 is not used to mount a headpiece with a casing (e.g., the headpiece 101), the J-shaped bottom rails 2516 and 2517 are free to be used for supporting other components or accessories of a window blind. FIGS. 26A-B illustrate latching taps 2610 and 2620 latching onto the J-shaped bottom rail 2517 for installing a façade 2600, while the T-shaped supplemental bottom rail 2519 is used to latch the holder brackets 2570 and 2580. In some embodiments, optional fasteners 2615 and 2625 may be used to further tighten the latching taps 2610 and 2620 to the J-shaped bottom rail 2517.

Figure 27A:
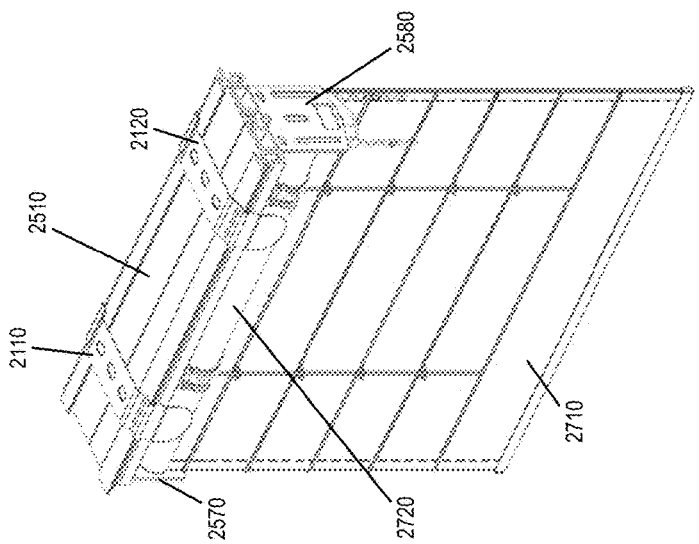
FIGS. 27A-B illustrate the T-shaped supplemental bottom rail and the J-shaped bottom rail being used jointly to install a Roman shade.
Figure 27B:
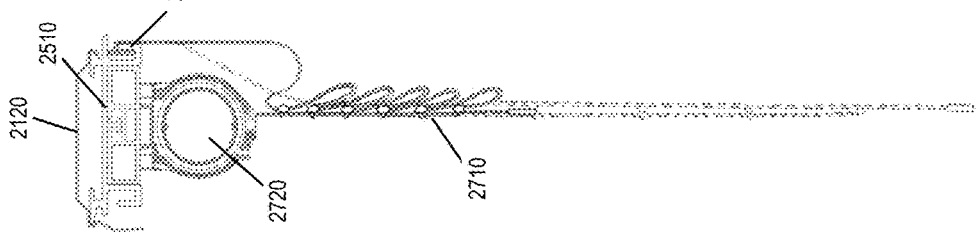

FIGS. 27A-B illustrate the T-shaped supplemental bottom rail 2519 and the J-shaped bottom rail 2516 being used jointly to install a Roman shade 2710. As illustrated, the J-shaped bottom rail 2516 holds up one end of the Roman shade 2710, while the T-shaped supplemental bottom rail 2519 is used to latch the holder brackets 2570 and 2580, which bracket a roller 2720 of the Roman shade 2710.

Figure 28A:
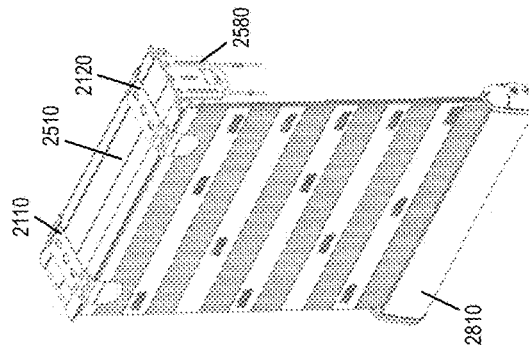
FIGS. 28A-B illustrate a J-shaped bottom rail being used to latch one end of a window blind while holder brackets support a roller of the window blind.
Figure 28B:
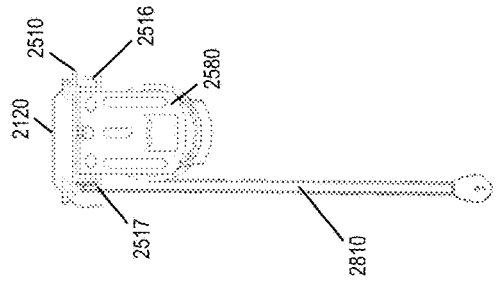
Figure 29A:
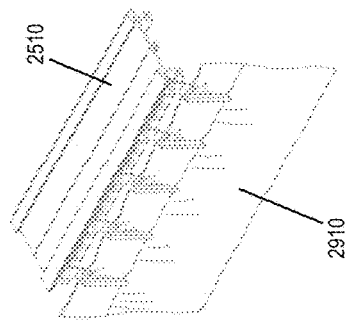
FIGS. 29A-B illustrate the J-shaped bottom rail being used to hang a window blind without a headpiece.
Figure 29B:
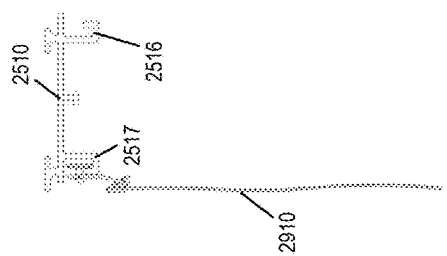
Figure 30A:
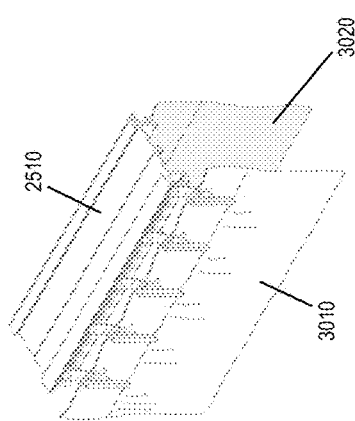
FIGS. 30A-B illustrate both J-shaped bottom rails of the headrail being used to hang window blinds.
Figure 30B:
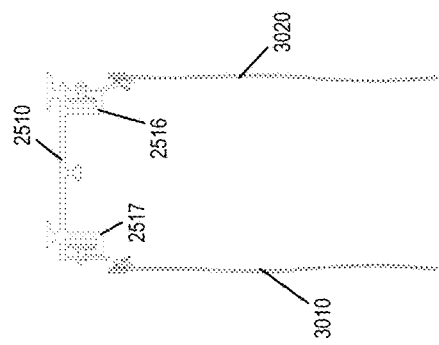

FIGS. 28A-B illustrate the J-shaped bottom rail 2517 being used to latch one end of a window blind 2810 while the holder brackets 2570 and 2580 support the roller 2820 of the window blind 2810. FIGS. 29A-B illustrate the J-shaped bottom rail 2517 being used to hang a window blind 2910 without a headpiece. FIGS. 30A-B illustrate both J-shaped bottom rails 2517 and 2518 of the headrail being used to hang window blinds 3010 and 3020. In each of the examples shown in FIGS. 26-30, the mounting clips 2110 and 2120 are mounted to the ceiling and the headrail 2510 is snapped into the mounting clips.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
providing a flex bracket comprising a top plate, a middle plate, and a bottom plate that are configured to form an embrace for supporting a headpiece casing of a window blind, wherein the middle plate is perpendicular to the top and bottom plates, wherein the headpiece casing comprises first and second parallel exterior surfaces that are perpendicular to the top, middle and bottom plates;
providing a first railing device comprising (i) a first recess cavity for mating with the top plate of the flex bracket to fix the first railing device to the flex bracket and (ii) a sidewall configured to abut only the first parallel exterior surface of the headpiece casing but not the second parallel exterior surface; and
providing a second railing device comprising (i) a second recess cavity for mating with the top plate of the flex bracket to fix the second railing device to the flex bracket and (ii) two guide rails configured to abut both the first and second parallel exterior surfaces of the headpiece casing.

2. The method of claim 1, wherein the flex bracket is configured to be mounted to a wall surface that is inside a window frame.

3. The method of claim 2, wherein the flex bracket is configured to be mounted by fasteners through the middle plate of the flex bracket to a wall surface that is inside a window frame.

4. The method of claim 1, wherein the sidewall of the first railing device is configured to abut a side surface and a bottom surface of the headpiece casing.

5. The method of claim 4, wherein the sidewall is configured to be fastened to a wall surface.

6. The method of claim 5, further comprising providing a spacer, wherein the sidewall is configured to be fastened to the wall surface through the spacer.

7. The method of claim 1, wherein the first recess cavity is formed by (i) a first flat plate that is configured to span across the flex bracket and (ii) two inward protrusions below the flat plate.

8. The method of claim 7, wherein the center of the first recess cavity is not aligned with the center of the headpiece casing.

9. The method of claim 1, wherein the second recess cavity is formed by (i) a second flat plate that is configured to span across the headpiece and (ii) two inward protrusions above the second flat plate.

10. The method of claim 9, wherein the center of the second recess cavity is not aligned with the center of the headpiece casing.

11. The method of claim 1, wherein the flex bracket is configured to be mounted by fasteners to a wall surface above, the fasteners go through the top plate of the flex bracket, the first railing device, and a spacer.

12. The method of claim 11, wherein the wall surface is inside a window frame.

13. The method of claim 11, wherein the spacer is configured to provide sufficient room for the second railing device to slide along the headpiece casing.

14. The method of claim 1, wherein:
when only the first but not the second railing device is fixed to the flex bracket, the headpiece casing is free to slide in and out of the embrace with the sidewall of the first railing device serving as a backstop,
when both the first and second railing devices are fixed to the flex bracket, the headpiece casing is locked into the embrace.

15. A method comprising:
providing a flex bracket comprising a top plate, a middle plate, and a bottom plate, wherein the bottom plate is configured to be fastened to a headpiece casing of a window blind;
providing a first railing device comprising (i) a first recess cavity for mating with the top plate of the flex bracket to fix the first railing device to the flex bracket and (ii) two outward protrusions;
providing a mounting clip that is configured to snap onto the two outward protrusions of the first railing device; and
providing a mounting bracket that is configured to be mounted to a vertical wall surface and to be fastened to by the mounting clip.

16. The method of claim 15, wherein the first railing device comprises two inward protrusions, and a first flat plate that is configured to span the width of the headpiece casing, wherein the first recess cavity of the first railing device is formed by the first flat plate and the two inward protrusions.

17. The method of claim 15, wherein the first railing device has a sidewall that is configured to abut a side surface of the headpiece casing, the side surface being perpendicular to the top, middle, and bottom plates of the flex bracket.

18. The method of claim 15, wherein the first railing device further comprises a flat plate that is configured to span the width of the headpiece casing, wherein the two outward protrusions of the first railing device are two ends of the flat plate.

19. The method of claim 15, wherein the mounting bracket is L-shaped and comprises a first section for fastening to the vertical wall surface and a second section to be fastened to by the mounting clip.

20. The method of claim 15, wherein the vertical wall is outside of a window frame.

* * * * *